United States Patent
Reeves et al.

(10) Patent No.: US 9,071,625 B2
(45) Date of Patent: Jun. 30, 2015

(54) CROSS-ENVIRONMENT EVENT NOTIFICATION

(75) Inventors: Paul Reeves, Oakville (CA); Wuke Liu, Mississauga (CA)

(73) Assignee: Z124, George Town (KY)

( * ) Notice: Subject to any disclaimer, the term of this patent is extended or adjusted under 35 U.S.C. 154(b) by 409 days.

(21) Appl. No.: 13/250,764

(22) Filed: Sep. 30, 2011

(65) Prior Publication Data

US 2012/0084793 A1    Apr. 5, 2012

Related U.S. Application Data

(60) Provisional application No. 61/389,117, filed on Oct. 1, 2010, provisional application No. 61/507,199, filed on Jul. 13, 2011, provisional application No. 61/507,201, filed on Jul. 13, 2011, provisional application No. 61/507,203, filed on Jul. 13, 2011, provisional application No. 61/507,206, filed on Jul. 13, 2011, provisional application No. 61/507,209, filed on Jul. 13, 2011.

(51) Int. Cl.
*G06F 3/00* (2006.01)
*G06F 9/44* (2006.01)
*G06F 9/46* (2006.01)
*G06F 13/00* (2006.01)
*H04L 29/08* (2006.01)
*G06F 9/455* (2006.01)

(52) U.S. Cl.
CPC ........ *H04L 67/1095* (2013.01); *G06F 9/45537* (2013.01)

(58) Field of Classification Search
CPC ........................ G06F 9/45537; G04L 67/1095
USPC .......................................................... 719/313
See application file for complete search history.

(56) References Cited

U.S. PATENT DOCUMENTS 5,396,630 A    3/1995    Banda et al.
5,673,403 A    9/1997    Brown et al.
(Continued)

FOREIGN PATENT DOCUMENTS

JP    7219903    8/1995
JP    08115144    5/1996
(Continued)

OTHER PUBLICATIONS

U.S. Appl. No. 13/843,086, filed Mar. 15, 2013, Reeves et al.
(Continued)

*Primary Examiner* — Timothy A Mudrick
(74) *Attorney, Agent, or Firm* — Sheridan Ross P.C.

(57) ABSTRACT

A mobile computing device with a mobile operating system and desktop operating system running concurrently and independently on a shared kernel without virtualization. The mobile operating system provides a user experience for the mobile computing device that suits the mobile environment. The desktop operating system provides a full desktop user experience when the mobile computing device is docked to a second user environment. Cross-environment notification and event handling allows the user to be notified of and respond to events occurring within the mobile operating system through the user environment associated with the desktop operating system. Events that may trigger cross-environment notification may be local events and/or remote events. The mobile computing device may be a smartphone running the Android mobile operating system and a full desktop Linux distribution on a modified Android kernel.

20 Claims, 10 Drawing Sheets

(56) References Cited

U.S. PATENT DOCUMENTS

| | | | |
|---|---|---|---|
| 5,764,984 A | 6/1998 | Loucks | |
| 5,874,928 A | 2/1999 | Kou | |
| 6,108,715 A | 8/2000 | Leach et al. | |
| 6,157,959 A | 12/2000 | Bonham et al. | |
| 6,178,503 B1 | 1/2001 | Madden et al. | |
| 6,182,158 B1 | 1/2001 | Kougiouris et al. | |
| 6,260,075 B1 | 7/2001 | Cabrero et al. | |
| 6,477,585 B1* | 11/2002 | Cohen et al. | 719/318 |
| 6,486,890 B1 | 11/2002 | Harada et al. | |
| 6,507,336 B1 | 1/2003 | Lunsford | |
| 6,573,913 B1 | 6/2003 | Butler et al. | |
| 6,694,368 B1 | 2/2004 | An et al. | |
| 6,826,703 B2 | 11/2004 | Kawano et al. | |
| 6,917,963 B1 | 7/2005 | Hipp et al. | |
| 6,927,908 B2 | 8/2005 | Stark | |
| 6,961,941 B1 | 11/2005 | Nelson et al. | |
| 6,970,173 B2 | 11/2005 | Ciolac | |
| 7,007,240 B1 | 2/2006 | Anderson et al. | |
| 7,069,519 B1 | 6/2006 | Okude et al. | |
| 7,127,723 B2 | 10/2006 | Endo et al. | |
| 7,284,203 B1 | 10/2007 | Meeks et al. | |
| 7,453,465 B2 | 11/2008 | Schmieder et al. | |
| 7,478,341 B2 | 1/2009 | Dove | |
| 7,489,503 B2 | 2/2009 | Maatta | |
| 7,565,535 B2 | 7/2009 | Roberts et al. | |
| 7,681,134 B1 | 3/2010 | Grechishkin et al. | |
| 7,705,799 B2 | 4/2010 | Niwa | |
| 7,880,728 B2 | 2/2011 | de los Reyes et al. | |
| 7,949,633 B1 | 5/2011 | Shaver et al. | |
| 7,950,008 B2 | 5/2011 | Bhide et al. | |
| 7,960,945 B1 | 6/2011 | Onorato et al. | |
| 8,194,001 B2 | 6/2012 | Miller et al. | |
| 8,397,245 B2 | 3/2013 | Filali-Adib et al. | |
| 8,704,777 B2 | 4/2014 | Small et al. | |
| 2002/0010844 A1 | 1/2002 | Noel et al. | |
| 2002/0130888 A1 | 9/2002 | Perry et al. | |
| 2002/0157001 A1 | 10/2002 | Huang et al. | |
| 2002/0158811 A1 | 10/2002 | Davis | |
| 2003/0001848 A1 | 1/2003 | Doyle et al. | |
| 2003/0020954 A1 | 1/2003 | Udom et al. | |
| 2003/0079010 A1 | 4/2003 | Osborn | |
| 2003/0079205 A1 | 4/2003 | Miyao et al. | |
| 2003/0115443 A1 | 6/2003 | Cepulis et al. | |
| 2003/0131143 A1* | 7/2003 | Myers | 709/318 |
| 2003/0174172 A1 | 9/2003 | Conrad et al. | |
| 2003/0177285 A1 | 9/2003 | Hunt et al. | |
| 2003/0179541 A1 | 9/2003 | Sullivan | |
| 2003/0226116 A1 | 12/2003 | Kuwata et al. | |
| 2004/0137855 A1 | 7/2004 | Wiley et al. | |
| 2004/0141085 A1 | 7/2004 | Nickel et al. | |
| 2004/0226023 A1 | 11/2004 | Tucker | |
| 2005/0034017 A1 | 2/2005 | Airaud et al. | |
| 2005/0083642 A1 | 4/2005 | Senpuku et al. | |
| 2005/0193267 A1 | 9/2005 | Liu et al. | |
| 2005/0216594 A1 | 9/2005 | O'Brien et al. | |
| 2005/0237587 A1 | 10/2005 | Nakamura | |
| 2005/0246505 A1 | 11/2005 | McKenney et al. | |
| 2005/0248501 A1 | 11/2005 | Kim | |
| 2006/0005187 A1 | 1/2006 | Neil | |
| 2006/0010314 A1 | 1/2006 | Xu | |
| 2006/0031572 A1 | 2/2006 | Feuerstein et al. | |
| 2006/0107020 A1 | 5/2006 | Stillwell, Jr. et al. | |
| 2006/0136828 A1 | 6/2006 | Asano | |
| 2006/0139862 A1 | 6/2006 | Wang et al. | |
| 2006/0183505 A1 | 8/2006 | Willrich | |
| 2006/0187142 A1 | 8/2006 | Lesniak | |
| 2006/0227806 A1 | 10/2006 | Tseng | |
| 2006/0248404 A1 | 11/2006 | Lindsay et al. | |
| 2007/0005661 A1 | 1/2007 | Yang | |
| 2007/0014295 A1 | 1/2007 | Fernandes et al. | |
| 2007/0022155 A1 | 1/2007 | Owens et al. | |
| 2007/0033260 A1 | 2/2007 | Grouzdev et al. | |
| 2007/0050751 A1 | 3/2007 | Husmann et al. | |
| 2007/0067769 A1 | 3/2007 | Geisinger | |
| 2007/0085759 A1 | 4/2007 | Lee et al. | |
| 2007/0111750 A1 | 5/2007 | Stohr et al. | |
| 2007/0136356 A1 | 6/2007 | Smith et al. | |
| 2007/0156729 A1 | 7/2007 | Shaylor | |
| 2007/0164923 A1 | 7/2007 | Kanai et al. | |
| 2007/0182663 A1 | 8/2007 | Biech | |
| 2007/0198760 A1 | 8/2007 | Han | |
| 2007/0271522 A1 | 11/2007 | Son et al. | |
| 2007/0285401 A1 | 12/2007 | Ohki et al. | |
| 2007/0288941 A1 | 12/2007 | Dunshea et al. | |
| 2008/0024388 A1 | 1/2008 | Bruce | |
| 2008/0057910 A1 | 3/2008 | Thoresson et al. | |
| 2008/0062625 A1 | 3/2008 | Batio | |
| 2008/0071595 A1 | 3/2008 | Chang et al. | |
| 2008/0082815 A1 | 4/2008 | Kawano et al. | |
| 2008/0090525 A1 | 4/2008 | Joo | |
| 2008/0119237 A1 | 5/2008 | Kim | |
| 2008/0119731 A1 | 5/2008 | Becerra et al. | |
| 2008/0126762 A1 | 5/2008 | Kelley et al. | |
| 2008/0134061 A1 | 6/2008 | Banerjee et al. | |
| 2008/0155103 A1 | 6/2008 | Bailey | |
| 2008/0244599 A1 | 10/2008 | Hodson et al. | |
| 2008/0282181 A1 | 11/2008 | Ferguson | |
| 2008/0291283 A1 | 11/2008 | Achiwa et al. | |
| 2008/0299951 A1 | 12/2008 | Karkanias et al. | |
| 2009/0037649 A1 | 2/2009 | Xu | |
| 2009/0055749 A1 | 2/2009 | Chatterjee et al. | |
| 2009/0083829 A1 | 3/2009 | Peterson | |
| 2009/0089569 A1 | 4/2009 | Baribault et al. | |
| 2009/0100429 A1 | 4/2009 | Thoelke et al. | |
| 2009/0109468 A1 | 4/2009 | Barclay et al. | |
| 2009/0119580 A1 | 5/2009 | Rohrabaugh et al. | |
| 2009/0138818 A1 | 5/2009 | Nemoto | |
| 2009/0158299 A1 | 6/2009 | Carter | |
| 2009/0164930 A1 | 6/2009 | Chen et al. | |
| 2009/0176571 A1 | 7/2009 | Sternberg | |
| 2009/0217071 A1 | 8/2009 | Huang et al. | |
| 2009/0219254 A1 | 9/2009 | Lai et al. | |
| 2009/0249247 A1 | 10/2009 | Tseng et al. | |
| 2009/0249331 A1 | 10/2009 | Davis et al. | |
| 2009/0257657 A1 | 10/2009 | Temmermans et al. | |
| 2009/0278806 A1 | 11/2009 | Duarte et al. | |
| 2009/0298546 A1 | 12/2009 | Kim et al. | |
| 2009/0305743 A1 | 12/2009 | Gouesbet et al. | |
| 2009/0313440 A1 | 12/2009 | Kim et al. | |
| 2009/0327560 A1 | 12/2009 | Yalovsky | |
| 2010/0005396 A1 | 1/2010 | Nason et al. | |
| 2010/0007603 A1 | 1/2010 | Kirkup | |
| 2010/0013863 A1 | 1/2010 | Harris | |
| 2010/0037166 A1 | 2/2010 | Chandrasekar et al. | |
| 2010/0046026 A1 | 2/2010 | Heo | |
| 2010/0049775 A1 | 2/2010 | Rajawat | |
| 2010/0060549 A1* | 3/2010 | Tsern | 345/2.1 |
| 2010/0063994 A1 | 3/2010 | Cook et al. | |
| 2010/0064228 A1 | 3/2010 | Tsern | |
| 2010/0064244 A1 | 3/2010 | Kilpatrick et al. | |
| 2010/0064536 A1 | 3/2010 | Caskey et al. | |
| 2010/0066763 A1 | 3/2010 | Macdougall et al. | |
| 2010/0079355 A1 | 4/2010 | Kilpatrick, II et al. | |
| 2010/0085274 A1 | 4/2010 | Kilpatrick et al. | |
| 2010/0085301 A1 | 4/2010 | Cohen et al. | |
| 2010/0085382 A1 | 4/2010 | Lundqvist et al. | |
| 2010/0097386 A1 | 4/2010 | Kim et al. | |
| 2010/0107163 A1 | 4/2010 | Lee | |
| 2010/0110480 A1 | 5/2010 | Satake | |
| 2010/0122271 A1 | 5/2010 | Labour et al. | |
| 2010/0149121 A1* | 6/2010 | Alexander et al. | 345/173 |
| 2010/0157518 A1 | 6/2010 | Ladouceur et al. | |
| 2010/0164836 A1 | 7/2010 | Liberatore | |
| 2010/0177019 A1 | 7/2010 | Jeong et al. | |
| 2010/0177047 A1 | 7/2010 | Brenneman et al. | |
| 2010/0207903 A1 | 8/2010 | Kim et al. | |
| 2010/0211769 A1 | 8/2010 | Shankar et al. | |
| 2010/0245256 A1 | 9/2010 | Estrada et al. | |
| 2010/0246119 A1 | 9/2010 | Collopy et al. | |
| 2010/0250975 A1 | 9/2010 | Gill et al. | |
| 2010/0251233 A1 | 9/2010 | Majewski et al. | |
| 2010/0319008 A1 | 12/2010 | Ho | |
| 2010/0321275 A1 | 12/2010 | Hinckley et al. | |
| 2011/0012858 A1 | 1/2011 | Brookes et al. | |

(56) References Cited

U.S. PATENT DOCUMENTS

| | | |
|---|---|---|
| 2011/0016299 A1 | 1/2011 | Galicia et al. |
| 2011/0016301 A1 | 1/2011 | Galicia et al. |
| 2011/0018901 A1 | 1/2011 | Boorman et al. |
| 2011/0025625 A1 | 2/2011 | Hirako |
| 2011/0034214 A1 | 2/2011 | Hong et al. |
| 2011/0063192 A1 | 3/2011 | Miller et al. |
| 2011/0093691 A1 | 4/2011 | Galicia et al. |
| 2011/0093836 A1* | 4/2011 | Galicia et al. ............... 717/139 |
| 2011/0096014 A1 | 4/2011 | Fuyuno et al. |
| 2011/0102314 A1 | 5/2011 | Roux |
| 2011/0113329 A1 | 5/2011 | Pusateri |
| 2011/0115713 A1 | 5/2011 | Altman et al. |
| 2011/0115737 A1 | 5/2011 | Fuyuno et al. |
| 2011/0126216 A1 | 5/2011 | Galicia et al. |
| 2011/0167492 A1 | 7/2011 | Ghosh et al. |
| 2011/0193806 A1 | 8/2011 | Kim et al. |
| 2011/0209102 A1 | 8/2011 | Hinckley et al. |
| 2011/0210922 A1 | 9/2011 | Griffin |
| 2011/0216064 A1 | 9/2011 | Dahl et al. |
| 2011/0225538 A1 | 9/2011 | Oyagi et al. |
| 2011/0239142 A1 | 9/2011 | Steeves et al. |
| 2011/0246904 A1 | 10/2011 | Pinto et al. |
| 2011/0260997 A1 | 10/2011 | Ozaki |
| 2011/0267478 A1 | 11/2011 | Jacobs |
| 2011/0273464 A1 | 11/2011 | Brunner et al. |
| 2011/0273475 A1 | 11/2011 | Herz et al. |
| 2011/0289444 A1 | 11/2011 | Winsky |
| 2011/0291964 A1 | 12/2011 | Chambers et al. |
| 2011/0312349 A1 | 12/2011 | Forutanpour |
| 2012/0005602 A1 | 1/2012 | Anttila et al. |
| 2012/0005691 A1 | 1/2012 | Wong et al. |
| 2012/0026069 A1 | 2/2012 | Ohsaki |
| 2012/0060089 A1 | 3/2012 | Heo et al. |
| 2012/0066581 A1 | 3/2012 | Spalink |
| 2012/0076197 A1 | 3/2012 | Byford et al. |
| 2012/0081278 A1 | 4/2012 | Freedman |
| 2012/0081353 A1 | 4/2012 | Yusupov et al. |
| 2012/0081354 A1 | 4/2012 | Yusupov et al. |
| 2012/0081380 A1 | 4/2012 | Reeves et al. |
| 2012/0081383 A1 | 4/2012 | Reeves et al. |
| 2012/0081396 A1 | 4/2012 | Yusupov et al. |
| 2012/0084480 A1 | 4/2012 | Reeves et al. |
| 2012/0084481 A1 | 4/2012 | Reeves et al. |
| 2012/0084542 A1 | 4/2012 | Reeves et al. |
| 2012/0084675 A1 | 4/2012 | Sirpal et al. |
| 2012/0084697 A1 | 4/2012 | Reeves |
| 2012/0084791 A1 | 4/2012 | Benedek et al. |
| 2012/0084792 A1 | 4/2012 | Benedek et al. |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089906 A1 | 4/2012 | Reeves et al. |
| 2012/0089992 A1 | 4/2012 | Reeves et al. |
| 2012/0094716 A1 | 4/2012 | Reeves |
| 2012/0172088 A1 | 7/2012 | Kirch et al. |
| 2012/0176413 A1 | 7/2012 | Kulik et al. |
| 2012/0188185 A1 | 7/2012 | Cassar |
| 2012/0278747 A1 | 11/2012 | Abraham et al. |
| 2012/0278750 A1 | 11/2012 | Abraham et al. |
| 2013/0019183 A1 | 1/2013 | Reeves et al. |
| 2013/0021262 A1 | 1/2013 | Chen |
| 2013/0024778 A1 | 1/2013 | Reeves et al. |
| 2013/0024812 A1 | 1/2013 | Reeves et al. |
| 2013/0076672 A1 | 3/2013 | Sirpal et al. |
| 2013/0076677 A1 | 3/2013 | Kretz |
| 2013/0076678 A1 | 3/2013 | Kretz |
| 2013/0076679 A1 | 3/2013 | Kretz |
| 2013/0076683 A1 | 3/2013 | Reeves |
| 2013/0079062 A1 | 3/2013 | Sirpal et al. |
| 2013/0080945 A1 | 3/2013 | Reeves |
| 2013/0088411 A1 | 4/2013 | Reeves et al. |
| 2013/0167159 A1 | 6/2013 | Ricci et al. |

FOREIGN PATENT DOCUMENTS

| | | |
|---|---|---|
| JP | 2008225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |

OTHER PUBLICATIONS

U.S. Appl. No. 13/485,734, filed May 31, 2012, Reeves et al.

Google Transliteration IME website, 2010, available at www.google.com/ime/transliteration/help.html#features, 8 pages.

InputKing Online Input System, 2011, available at www.inputking.com, 2 pages.

Dutko, "Domo Arigato Mr Androidato—An Introduction to the New Google Mobile Linux Framework, Android," Linux Journal, Mar. 2008, vol. 2008, Iss. 167, 9 pages.

Mikeclay, "Launch Multiple Programs at Once Using Simple Batch File," Feb. 5, 2009 available at www.web.archive.org/web/20090205134920/http://www.windowsreference.com/windows-2000/launch-multiple-programs-at-once-using-simple-batch-file/, 5 pages.

Sakhr Software—Arabic Optical Character Recognition, Jul. 15, 2011, available at www.sakhr.com/ocr.aspx, 1 page.

Wikipedia, "Balloon help," Jul. 18, 2011, available at www.en.wikipedia.org/wiki/Balloon_help, 3 pages.

Wikipedia, "Google Pinyin," Aug. 27, 2011 available at www.en.wikipedia.org/wiki/Google_Pinyin, 3 pages.

Wikipedia, "Mouseover," Sep. 29, 2011, available at www.en.wikipedia.org/wiki/Mouseover, 2 pages.

Wikipedia, "Predictive text," Aug. 7, 2011, available at www.en.wikipedia.org/wiki/Predictive_test, 6 pages.

Wikipedia, "Sogou Pinyin," Jul. 23, 2011 available at www.en.wikipedia.org/wiki/Sogou_Pinyin, 3 pages.

Wikipedia, "Status bar," Sep. 8, 2011, available at www.en.wikipedia.org/wiki/Status_bar, 3 pages.

Wikipedia, "Tooltip," Sep. 17, 2011, available at www.en.wikipedia.org/wiki/Tooltip, 2 pages.

International Search Report and Written Opinion for International Patent Application No. PCT/US2012/046800, mailed Feb. 20, 2013, 9 pages.

International Search Report and Written Opinion for International Patent Application No. PCT/US2012/046802, mailed Feb. 20, 2013, 9 pages.

International Preliminary Report on Patentability for International Patent Application No. PCT/US2011/056149, mailed Apr. 25, 2013, 6 pages.

International Search Report for International Patent Application No. PCT/US11/52822, mailed Apr. 27, 2012, 5 pages.

International Preliminary Report on Patentability for International (PCT) Patent Application No. PCT/US2011/052822, mailed Apr. 11, 2013 7 pages.

International Search Report for International Patent Application No. PCT/US11/52598, mailed Mar. 27, 2012, 3 pages.

International Preliminary Report on Patentability for International (PCT) Patent Application No. PCT/US2011/052598, mailed Apr. 11, 2013 9 pages.

International Search Report for International Patent Application No. PCT/US11/53835, mailed Apr. 30, 2012, 5 pages.

Written Opinion for International Patent Application No. PCT/US11/53835, mailed Apr. 30, 2012, 4 pages.

International Preliminary Report on Patentability for International (PCT) Patent Application No. PCT/US2011/053835, mailed Apr. 11, 2013 6 pages.

International Preliminary Report on Patentability for International Patent Application No. PCT/US2011/053130, mailed Apr. 11, 2013, 6 pages.

(56) References Cited

OTHER PUBLICATIONS

International Preliminary Report on Patentability for International Patent Application No. PCT/US2011/053826, mailed Apr. 11, 2013, 6 pages.
International Preliminary Report on Patentability for International Patent Application No. PCT/US2011/052988, mailed Apr. 11, 2013, 6 pages.
International Preliminary Report on Patentability for International Patent Application No. PCT/US2011/054605, mailed Apr. 11, 2013, 7 pages.
International Preliminary Report on Patentability for International Patent Application No. PCT/US2011/053909, mailed Apr. 11, 2013, 6 pages.
International Preliminary Report on Patentability for International Patent Application No. PCT/US2011/054623, mailed Apr. 11, 2013, 6 pages.
International Preliminary Report on Patentability for International Patent Application No. PCT/US2011/053037, mailed Apr. 11, 2013, 8 pages.
International Preliminary Report on Patentability for International Patent Application No. PCT/US2011/053923, mailed Apr. 11, 2013, 6 pages.
International Preliminary Report on Patentability for International Patent Application No. PCT/US2011/054017, mailed Apr. 11, 2013, 6 pages.
International Search Report for International Patent Application No. PCT/US11/54105, mailed Apr. 30, 2012, 3 pages.
International Preliminary Report on Patentability for International (PCT) Patent Application No. PCT/US2011/054105, mailed Apr. 11, 2013 5 pages.
International Search Report for International Patent Application No. PCT/US11/53585, mailed May 4, 2012, 3 pages.
International Preliminary Report on Patentability for International (PCT) Patent Application No. PCT/US2011/053585, mailed Apr. 11, 2013 6 pages.
International Preliminary Report on Patentability for International Patent Application No. PCT/US2011/053665, mailed Apr. 11, 2013, 6 pages.
International Preliminary Report on Patentability for International Patent Application No. PCT/US2011/053691, mailed Apr. 11, 2013, 6 pages.
International Preliminary Report on Patentability for International Patent Application No. PCT/US2011/054019, mailed Apr. 11, 2013, 6 pages.
International Preliminary Report on Patentability for International Patent Application No. PCT/US2011/053127, mailed Apr. 11, 2013, 6 pages.
Official Action for U.S. Appl. No. 13/247,719, mailed Mar. 29, 2013 16 pages.
Official Action for U.S. Appl. No. 13/247,719, mailed Aug. 16, 2013 20 pages.
Official Action for U.S. Appl. No. 13/484,951, mailed Aug. 17, 2012, 13 pages.
Official Action for U.S. Appl. No. 13/484,951, mailed Mar. 11, 2013 11 pages.
Official Action for U.S. Appl. No. 13/484,951, mailed Jul. 25, 2013 12 pages.
Official Action for U.S. Appl. No. 13/399,901, mailed Aug. 2, 2013 17 pages.
Official Action for U.S. Appl. No. 13/399,936, mailed Sep. 10, 2013 23 pages.
Official Action for U.S. Appl. No. 12/905,920 mailed Apr. 25, 2013, 16 pages.
Official Action for U.S. Appl. No. 12/948,686, mailed Jul. 26, 2013 11 pages.
Official Action for U.S. Appl. No. 12/948,701, mailed Nov. 16, 2012, 16 pages.
Official Action for U.S. Appl. No. 12/948,701, mailed Jun. 7, 2013 16 pages.
Official Action for U.S. Appl. No. 13/246,665, mailed Apr. 24, 2013 30 pages.
Official Action for U.S. Appl. No. 13/246,665, mailed Aug. 28, 2013 33 pages.
Official Action for U.S. Appl. No. 13/217,099 mailed Apr. 10, 2013, 53 pages.
Official Action for U.S. Appl. No. 13/247,885 mailed Mar. 19, 2013, 19 pages.
Notice of Allowance for U.S. Appl. No. 13/247,885, mailed Aug. 29, 2013 12 pages.
Official Action for U.S. Appl. No. 13/247,166, mailed Mar. 21, 2013 4 pages Restriction Requirement.
Official Action for U.S. Appl. No. 13/247,166, mailed Jul. 2, 2013 12 pages.
Official Action for U.S. Appl. No. 13/217,130 mailed Mar. 15, 2013, 12 pages.
Official Action for U.S. Appl. No. 13/247,170 mailed Apr. 11, 2013, 36 pages.
Official Action for U.S. Appl. No. 13/247,170, mailed Aug. 5, 2013 34 pages.
Official Action for U.S. Appl. No. 13/246,699, mailed Jul. 12, 2013 18 pages.
Notice of Allowance for U.S. Appl. No. 13/246,669, mailed Sep. 11, 2013 16 pages.
Official Action for U.S. Appl. No. 13/246,671, mailed Mar. 27, 2013 34 pages.
Official Action for U.S. Appl. No. 13/246,671, mailed Jul. 15, 2013.
Official Action for U.S. Appl. No. 13/246,128 mailed May 10, 2013, 40 pages.
Official Action for U.S. Appl. No. 13/246,128, mailed Aug. 23, 2013 46 pages.
Official Action for U.S. Appl. No. 13/246,133 mailed Apr. 16, 2013, 25 pages.
Official Action for U.S. Appl. No. 13/246,133, mailed Aug. 23, 2013 32 pages.
Official Action for U.S. Appl. No. 13/246,675 mailed May 1, 2013, 27 pages.
Official Action for U.S. Appl. No. 13/217,121 mailed Mar. 6, 2013, 11 pages.
Official Action for U.S. Appl. No. 13/217,121, mailed Aug. 1, 2013 11 pages.
"Lapdock™ for Motorola ATRIX," at http://www.motorola.com/Consumers/US-EN/Consumer-Product-and-Services/Mobile . . . , accessed Apr. 18, 2011, 1 page.
"Motorola ATRIX 4G Laptop Dock Review," at http://www.phonearena.com/reviews/Motorola-ATRIX-4G-Laptop-Dock-Review_id2667, Mar. 2, 2011, 6 pages.
Burns, C., "Motorola ATRIX 4G Laptop Dock Review," at http://androidcommunity.com/motorola-atrix-4g-laptop-dock-review-20110220/, Feb. 20, 2011, 5 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Google images, accessed Apr. 18, 2011, 6 pages.
Harman03, "Kyocera Echo Dual-screen Android Phone," posted 4 weeks from Apr. 18, 2011, 3 pages.
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Sud, et al., "Dynamic Migration of Computation Through Virtualization of the Mobile Platform," Mobile Networks and Applications, 2012, (published online Feb. 22, 2011), vol. 17, Iss. 2, pp. 206-215.
Website entitled, "Kyocera Echo," at www.echobykyocera.com/, 2011, 6 pages.
Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.
International Search Report for International Patent Application No. PCT/US2011/052988, mailed May 3, 2012, 5 pages.
Written Opinion for International Patent Application No. PCT/US2011/052988, mailed May 3, 2012, 4 pages.

(56) References Cited

OTHER PUBLICATIONS

International Search Report for International Patent Application No. PCT/US2011/053037, mailed Mar. 20, 2012, 5 pages.
Written Opinion for International Patent Application No. PCT/US2011/053037, mailed Mar. 20, 2012, 6 pages.
International Search Report for International Patent Application No. PCT/US2011/053127, mailed Apr. 24, 2012, 5 pages.
Written Opinion for International Patent Application No. PCT/US2011/053127, mailed Apr. 24, 2012, 4 pages.
International Search Report for International Patent Application No. PCT/US2011/053130, mailed Apr. 24, 2012, 5 pages.
Written Opinion for International Patent Application No. PCT/US2011/053130, mailed Apr. 24, 2012, 4 pages.
International Search Report for International Patent Application No. PCT/US2011/053665, mailed Apr. 30, 2012, 5 pages.
Written Opinion for International Patent Application No. PCT/US2011/053665, mailed Apr. 30, 2012, 4 pages.
International Search Report for International Patent Application No. PCT/US2011/053691, mailed May 4, 2012, 5 pages.
Written Opinion for International Patent Application No. PCT/US2011/053691, mailed May 4, 2012, 4 pages.
International Search Report for International Patent Application No. PCT/US2011/053826, mailed Apr. 27, 2012, 5 pages.
Written Opinion for International Patent Application No. PCT/US2011/053826, mailed Apr. 27, 2012, 4 pages.
International Search Report for International Patent Application No. PCT/US2011/053909, mailed Apr. 30, 2012, 5 pages.
Written Opinion for International Patent Application No. PCT/US2011/053909, mailed Apr. 30, 2012, 4 pages.
International Search Report for International Patent Application No. PCT/US2011/053923, mailed Apr. 30, 2012, 5 pages.
Written Opinion for International Patent Application No. PCT/US2011/053923, mailed Apr. 30, 2012, 4 pages.
International Search Report for International Patent Application No. PCT/US2011/054017, mailed Apr. 24, 2012, 5 pages.
Written Opinion for International Patent Application No. PCT/US2011/054017, mailed Apr. 24, 2012, 4 pages.
International Search Report for International Patent Application No. PCT/US2011/054019, mailed Apr. 10, 2012, 5 pages.
Written Opinion for International Patent Application No. PCT/US2011/054019, mailed Apr. 10, 2012, 4 pages.
International Search Report for International Patent Application No. PCT/US2011/054605, mailed Apr. 30, 2012, 5 pages.
Written Opinion for International Patent Application No. PCT/US2011/054605, mailed Apr. 30, 2012, 5 pages.
International Search Report for International Patent Application No. PCT/US2011/054623, mailed Apr. 27, 2012, 5 pages.
Written Opinion for International Patent Application No. PCT/US2011/054623, mailed Apr. 27, 2012, 4 pages.
International Search Report for International Patent Application No. PCT/US2011/056149, mailed Apr. 24, 2012, 5 pages.
Written Opinion for International Patent Application No. PCT/US2011/056149, mailed Apr. 24, 2012, 4 pages.
Official Action for U.S. Appl. No. 12/905,920 mailed Dec. 7, 2012, 13 pages.
Official Action for U.S. Appl. No. 12/905,920 mailed Jul. 3, 2012, 14 pages.
Official Action for U.S. Appl. No. 12/905,920 mailed Mar. 15, 2012, 12 pages.
Official Action for U.S. Appl. No. 13/246,669 mailed Jan. 8, 2013, 14 pages.
Official Action for U.S. Appl. No. 13/251,427 mailed Feb. 15, 2013, 18 pages.
Haselton, "Celio Announces Redfly Smart Phone Dock, Software for Windows PCs," Laptop Magazine, Jan. 8, 2009, [retrieved on Feb. 11, 2014], 4 pages. Retrieved from: blog.laptopmag.com/redfly-launches-smartphone-dock-software-for-windows-pcs.
McDermott "Porting Android to a new device," Embedded Software, Jan. 28, 2010, 12 pages [retrieved from: http://yidonghan.wordpress.com/2010/01/28/porting-android-to-a-new-device/].
Rebecka & Zingo, "Share memory using ashmem and binder in the android framework," Android Blog, Mar. 22, 2010, 14 pages [retrieved from: http://www.androidenea.com/2010/03/share-memory-using-ashmem-and-binder-in.html].
International Search Report for International (PCT) Patent Application No. PCT/US2012/046798, mailed Feb. 20, 2013 3 pages.
International Preliminary Report on Patentability for International (PCT) Patent Application No. PCT/US2012/046798, mailed Jan. 23, 2014 6 pages.
International Preliminary Report on Patentability for International (PCT) Patent Application No. PCT/US2012/046800, mailed Jan. 23, 2014 6 pages.
International Preliminary Report on Patentability for International Patent Application No. PCT/US2012/046802, mailed Jan. 23, 2014, 6 pages.
Extended Search Report for European Patent Application No. 11829766.2, dated Jan. 8, 2014 11 pages.
Official Action for U.S. Appl. No. 13/484,951, mailed Jan. 30, 2014 12 pages.
Notice of Allowance for U.S. Appl. No. 13/484,951, mailed May 12, 2014 7 pages.
Official Action for U.S. Appl. No. 13/624,565, mailed Jun. 5, 2014 30 pages.
Official Action for U.S. Appl. No. 13/628,380, mailed Jun. 5, 2014 16 pages.
Official Action for U.S. Appl. No. 13/629,415, mailed Apr. 25, 2014 16 pages.
Final Action for U.S. Appl. No. 13/399,901, mailed Dec. 26, 2013 20 pages.
Official Action for U.S. Appl. No. 13/399,901, mailed May 1, 2014 17 pages.
Official Action for U.S. Appl. No. 13/399,936, mailed Feb. 20, 2014 27 pages.
Notice of Allowance for U.S. Appl. No. 12/905,920, mailed Feb. 27, 2014 13 pages.
Official Action for U.S. Appl. No. 12/948,686, mailed Jan. 29, 2014 13 pages.
Notice of Allowance for U.S. Appl. No. 12/948,686, mailed May 9, 2014 7 pages.
Official Action for U.S. Appl. No. 12/948,701, mailed Jun. 3, 2014 19 pages.
Official Action for U.S. Appl. No. 13/246,665, mailed Feb. 27, 2014 38 pages.
Official Action for U.S. Appl. No. 13/217,099, mailed May 29, 2014 73 pages.
Notice of Allowance for U.S. Appl. No. 13/247,885, mailed Jan. 9, 2014 8 pages.
Official Action for U.S. Appl. No. 13/217,108 mailed Feb. 25, 2014, 22 pages.
Official Action for U.S. Appl. No. 13/251,427, mailed May 23, 2014 15 pages.
Official Action for U.S. Appl. No. 13/217,130, mailed Mar. 20, 2014 18 pages.
Official Action for U.S. Appl. No. 13/247,170, mailed Dec. 11, 2013 47 pages.
Official Action for U.S. Appl. No. 13/247,170, mailed Jun. 5, 2014 58 pages.
Notice of Allowance for U.S. Appl. No. 13/246,669, mailed Apr. 11, 2014 11 pages.
Official Action for U.S. Appl. No. 13/246,671, mailed Jun. 5, 2014 60 pages.
Official Action for U.S. Appl. No. 13/246,128, mailed Dec. 26, 2013 43 pages.
Official Action for U.S. Appl. No. 13/246,133, mailed Jan. 15, 2014 37 pages.
Official Action for U.S. Appl. No. 13/246,675, mailed Mar. 7, 2014 34 pages.
Official Action for U.S. Appl. No. 13/217,121, mailed Feb. 10, 2014 12 pages.
U.S. Appl. No. 14/068,662, filed Oct. 31, 2013, Benedek.
"Apple iPod and iPhone dock Connector Pinout," AliPinouts, Sep. 27, 2010, 3 pages [www.allpinouts.org/index/php/Apple_iPod,_iPad_and_iPhone_dock].

(56) References Cited

OTHER PUBLICATIONS

"How to Install Ubuntu on Your Nexus One/Android!" NexusOneHacks.net, Jul. 6, 2010, 9 pages [nexusonehacks.net/nexus-one-hacks/how-to-install-ubuntu-on-your-android].

Kilpatrick et al., "Securing the X Window System with SELinux," NAI Labs Report No. 03-006, 2003, 33 pages.

Stallman "GNU Operating System: Android and Users' Freedom," Sep. 2, 2013, 4 pages [gnu.org/philosophy/android-and-users-freedom.html].

Official Action for U.S. Appl. No. 13/399,929, mailed Dec. 3, 2013 21 pages.

Official Action for U.S. Appl. No. 12/905,920, mailed Sep. 30, 2013 20 pages.

Final Action for U.S. Appl. No. 13/217,099, mailed Oct. 9, 2013 74 pages.

Official Action for U.S. Appl. No. 13/217,108, mailed Oct. 11, 2013 13 pages.

Final Action for U.S. Appl. No. 13/251,427, mailed Oct. 21, 2013 17 pages.

Notice of Allowance for U.S. Appl. No. 13/247,166, mailed Nov. 4, 2013 14 pages.

Official Action for U.S. Appl. No. 13/217,130, mailed Sep. 16, 2013 12 pages.

Official Action for U.S. Appl. No. 13/246,671, mailed Nov. 20, 2013 50 pages.

Official Action for U.S. Appl. No. 13/246,675, mailed Sep. 27, 2013 32 pages.

Official Action for Mexican Patent Application No. MX/a/2013/003515, mailed Jun. 12, 2014, 3 pages (includes English summary).

Official Action for European Patent Application No. 11829880.1, mailed Aug. 13, 2014, 5 pages.

Official Action for U.S. Appl. No. 13/247,719, mailed Aug. 29, 2014 21 pages.

Official Action for U.S. Appl. No. 13/624,565, mailed Oct. 14, 2014 36 pages.

Official Action for U.S. Appl. No. 13/628,380, mailed Sep. 12, 2014 16 pages.

Official Action for U.S. Appl. No. 13/628,157, mailed Aug. 14, 2014 7 pages.

Official Action for U.S. Appl. No. 13/628,234, mailed Sep. 12, 2014 9 pages.

Official Action for U.S. Appl. No. 13/628,949, mailed Oct. 9, 2014 11 pages.

Official Action for U.S. Appl. No. 13/399,929, mailed Jun. 18, 2014 35 pages.

Notice of Allowance for U.S. Appl. No. 13/399,936, mailed Sep. 15, 2014 11 pages.

Official Action for U.S. Appl. No. 13/246,665, mailed Jun. 12, 2014 39 pages.

Official Action for U.S. Appl. No. 14/068,662, mailed Jul. 28, 2014 26 pages.

Official Action for U.S. Appl. No. 13/217,108, mailed Jun. 20, 2014 18 pages.

Notice of Allowance for U.S. Appl. No. 13/217,108, mailed Jul. 11, 2014 7 pages.

Official Action for U.S. Appl. No. 13/217,130, mailed Aug. 5, 2014 19 pages.

Notice of Allowance for U.S. Appl. No. 13/247,170, mailed Sep. 23, 2014 11 pages.

Notice of Allowance for U.S. Appl. No. 13/246,671, mailed Sep. 25, 2014 9 pages.

Official Action for U.S. Appl. No. 13/246,118, mailed Oct. 8, 2014 10 pages.

Official Action for U.S. Appl. No. 13/246,128, mailed Jun. 13, 2014 50 pages.

Official Action for U.S. Appl. No. 13/246,133, mailed Jun. 13, 2014 44 pages.

Notice of Allowance for U.S. Appl. No. 13/246,675, mailed Jul. 29, 2014 9 pages.

Official Action for U.S. Appl. No. 13/217,121, mailed Jun. 12, 2014 13 pages.

Extended Search Report for European Patent Application No. 11829853.8, dated Jan. 29, 2015 10 pages.

Notice of Allowance for U.S. Appl. No. 13/246,118, mailed Feb. 18, 2015 8 pages.

Notice of Allowance for U.S. Appl. No. 13/246,128, mailed Jan. 29, 2015 10 pages.

Notice of Allowance for Mexican Patent Application No. MX/a/2013/003515, mailed Nov. 5, 2014, 1 page.

European Extended Search Report for European Patent Application No. 11829880.1, mailed Dec. 5, 2014, 10 pages.

Notice of Allowance for Mexican Patent Application No. MX/a/2013/003427, mailed Nov. 26, 2014, 1 page.

Notice of Allowance for U.S. Appl. No. 14/498,330, mailed Oct. 27, 2014 8 pages.

Official Action for U.S. Appl. No. 13/624,565, mailed Jan. 8, 2015 47 pages.

Official Action for U.S. Appl. No. 13/628,380, mailed Jan. 2, 2015 18 pages.

Official Action for U.S. Appl. No. 13,628,170, mailed Nov. 3, 2014 9 pages.

Official Action for U.S. Appl. No. 13/629,415, mailed Dec. 3, 2014 22 pages.

Official Action for U.S. Appl. No. 13/399,901, mailed Oct. 29, 2014 23 pages.

Official Action for U.S. Appl. No. 12/948,701, mailed Dec. 15, 2014 19 pages.

Notice of Allowance for U.S. Appl. No. 13/246,665, mailed Jan. 13, 2015 9 pages.

Official Action for U.S. Appl. No. 13/217,099, mailed Dec. 1, 2014 82 pages.

Notice of Allowance for U.S. Appl. No. 14/068,662, mailed Jan. 12, 2015 15 pages.

Official Action for U.S. Appl. No. 13/251,427, mailed Dec. 8, 2014 17 pages.

Notice of Allowance for U.S. Appl. No. 13/217,130, mailed Dec. 3, 2014 5 pages.

Notice of Allowance for U.S. Appl. No. 13/246,133, mailed Jan. 21, 2015 10 pages.

Official Action for U.S. Appl. No. 13/217,121, mailed Dec. 18, 2014 15 pages.

* cited by examiner

CROSS-ENVIRONMENT EVENT NOTIFICATION

CROSS-REFERENCE TO RELATED APPLICATIONS

This Application is a non-provisional of and claims the benefit of the filing date of U.S. Provisional Application Nos. 61/389,117, filed Oct. 1, 2010, entitled "Multi-Operating System Portable Docking Device"; 61/507,199, filed Jul. 13, 2011, entitled "Dockable Mobile Software Architecture"; 61/507,201, filed Jul. 13, 2011, entitled "Cross-Environment Communication Framework"; 61/507,203, filed Jul. 13, 2011, entitled "Multi-Operating System"; 61/507,206, filed Jul. 13, 2011, entitled "Auto-Configuration of a Docked System in a Multi-OS Environment"; and 61/507,209, filed Jul. 13, 2011, entitled "Auto-Waking of a Suspended Secondary OS in a Dockable System," wherein the entire contents of the foregoing priority applications are incorporated herein by reference for all purposes.

BACKGROUND

1. Field

This Application relates generally to the field of mobile computing environments, and more particularly to supporting multiple user environments through the use of multiple operating systems in a single mobile computing device.

2. Relevant Background

Mobile computing devices are becoming ubiquitous in today's society. For example, as of the end of 2008, 90 percent of Americans had a mobile wireless device. At the same time, the capabilities of mobile devices are advancing rapidly, including smartphones that integrate advanced computing capabilities with mobile telephony capabilities. Mobile providers have launched hundreds of new smartphones in the last three years based upon several different platforms (e.g., Apple iPhone, Android, BlackBerry, Palm, and Windows Mobile). In the U.S., smartphone penetration reached almost 23% by the middle of 2010, and over 35% in some age-groups. In Europe, the smartphone market grew by 41% from 2009 to 2010, with over 60 million smartphone subscribers as of July 2010 in the five largest European countries alone.

While smartphones are gaining in popularity and computing capability, they provide a limited user experience. Specifically, they typically have an operating system that is modified for mobile device hardware and a restricted set of applications that are available for the modified operating system. For example, many smartphones run Google's Android operating system. Android runs only applications that are specifically developed to run within a Java-based virtual machine runtime environment. In addition, while Android is based on a modified Linux kernel, it uses different standard C libraries, system managers, and services than Linux. Accordingly, applications written for Linux do not run on Android without modification or porting. Similarly, Apple's iPhone uses the iOS mobile operating system. Again, while iOS is derived from Mac OS X, applications developed for OS X do not run on iOS. Therefore, while many applications are available for mobile operating systems such as Android and iOS, many other common applications for desktop operating systems such as Linux and Mac OS X are not available on the mobile platforms.

Accordingly, smartphones are typically suited for a limited set of user experiences and provide applications designed primarily for the mobile environment. In particular, smartphones do not provide a suitable desktop user experience, nor do they run most common desktop applications. As a result, many users carry and use multiple computing devices including a smartphone, laptop, and/or tablet computer. In this instance, each device has its own CPU, memory, file storage, and operating system.

Connectivity and file sharing between smartphones and other computing devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

SUMMARY

Embodiments of the present invention are directed to providing the mobile computing experience of a smartphone and the appropriate user experience of a secondary terminal environment in a single mobile computing device. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by a wired (e.g., USB, Firewire, Thunderbolt, etc.) or wireless (e.g., Bluetooth, WiFi, etc.) connection. In embodiments, a mobile operating system associated with the user experience of the mobile environment and a desktop operating system associated with the user experience of the secondary terminal environment are run concurrently and independently on a shared kernel.

According to one aspect consistent with various embodiments, a mobile operating system runs concurrently with a desktop operating system on a shared kernel. A method for cross-environment notification of events between the mobile operating system and the desktop operating system includes broadcasting an event notification in a mobile operating system in response to an event occurring within the mobile operating system, receiving the event notification in a notification receiver of the mobile operating system, filtering the event notification in an event filter of the mobile operating system for predetermined events, and sending a cross-environment notification associated with a predetermined event to a component of the desktop operating system through an inter-process communication channel based on a determination that the event notification matches the predetermined event.

According to other aspects consistent with various embodiments, the method may include querying the mobile operating system for a parameter associated with the event notification. The event notification may be received in a broadcast receiver of the mobile operating system. The broadcast receiver may perform runtime binding of predetermined events to cross-environment notifications. The method may include displaying, by the desktop operating system, a message and/or an icon associated with the cross-environment notification. The event notification may be received in an intent filter of a broadcast receiver of the mobile operating system. The cross-environment notification may be received in the desktop operating system by an event handler of a shared library of the desktop operating system. The mobile operating system may be an Android mobile operating system while the desktop operating system may be a Linux desktop operating system. The method may include receiving, in the mobile operating system, a reply from the component of the desktop operating system indicating an action to perform in response to a user selection of a notification callback of the cross-environment notification.

According to other aspects consistent with various embodiments, a mobile computing device includes a mobile operating system running concurrently with a desktop operating system on a shared kernel. The mobile computing device further includes a notification manager that broadcasts intent objects in response to events occurring within the mobile operating system, a broadcast receiver that receives the intent objects, an intent filter that filters the intent objects for intent objects associated with predetermined events; and a cross-environment event notifier that sends cross-environment notifications associated with the predetermined events to components of the desktop operating system that instantiate event listeners of a shared library corresponding to the predetermined events. The cross-environment notifications may be passed to the shared library through a socket. The cross-environment notifications may include messages associated with the intent objects, the event listeners of the shared library displaying the messages within a user environment associated with the desktop operating system.

According to other aspects consistent with various embodiments, a mobile computing device includes a computer-readable medium storing instructions for a physical processor. The instructions, when executed, cause the processor to perform steps including running a mobile operating system and a desktop operating system concurrently on a shared kernel, broadcasting an event notification in the mobile operating system in response to an event occurring within the mobile operating system, receiving the event notification in a notification receiver of the mobile operating system, filtering the event notification in an event filter of the mobile operating system for predetermined events, and sending a cross-environment notification associated with a predetermined event to a component of the desktop operating system through an inter-process communication channel based on a determination that the event notification matches the predetermined event.

According to other aspects consistent with various embodiments, the instructions may further cause the processor to perform the steps of querying the mobile operating system for a parameter associated with the event notification, receiving, in the mobile operating system, a reply from the component of the desktop operating system indicating an action to perform in response to a user selection of a notification callback of the cross-environment notification, displaying the notification on a display of a user environment associated with the desktop operating system, receiving the cross-environment notification in an event handler of a shared library of the desktop operating system, and/or sending a notification reply message from the desktop operating system to the mobile operating system indicating that the notification was received by a user. The mobile operating system may be an Android mobile operating system and the desktop operating system may be a Linux desktop operating system.

BRIEF DESCRIPTION OF THE DRAWINGS

Embodiments of the present invention are illustrated in referenced figures of the drawings, in which like numbers refer to like elements throughout the description of the figures.

DETAILED DESCRIPTION

Mobile telephony devices, (i.e., smartphones, handsets, mobile stations, portable communication devices, etc.) that include computing capabilities are increasing in popularity. Many of these smartphones include a mobile operating system ("OS") running on a mobile processor. While mobile processors and mobile OS's have increased the capabilities of these devices, smartphones have not tended to replace personal computer ("PC") environments (i.e., Windows, Mac OS X, Linux) such as desktop or notebook computers at least because of the limited user experience provided. In particular, the user interface device(s) found on smartphones are typically tailored to the mobile environment. For example, smartphones typically use a small thumb-style QWERTY keyboard, touch-screen display, click-wheel, and/or scroll-wheel as user interface devices. Mobile OSs, as well as applications (i.e., "Apps") developed for mobile OSs, are typically designed for the constraints of the mobile environment including a mobile processor and the user interface device(s) present on mobile devices. Therefore, many applications that have been developed for PC operating systems are not available for mobile OSs (i.e., are not compiled for and do not run on mobile OSs). In addition, for some tasks such as typing or editing documents, a full-size keyboard and large display are easier to use than the user interface components typically found on a smartphone.

Accordingly, users typically use separate computing devices for each computing experience, including a smartphone, tablet computer, laptop computer, and/or desktop computer. In this instance, each device has its own CPU, memory, file storage, and OS. Connectivity and file sharing between smartphones and other devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device.

This process, typically called "synching," is cumbersome and generally requires active management by the user.

Figure 1:
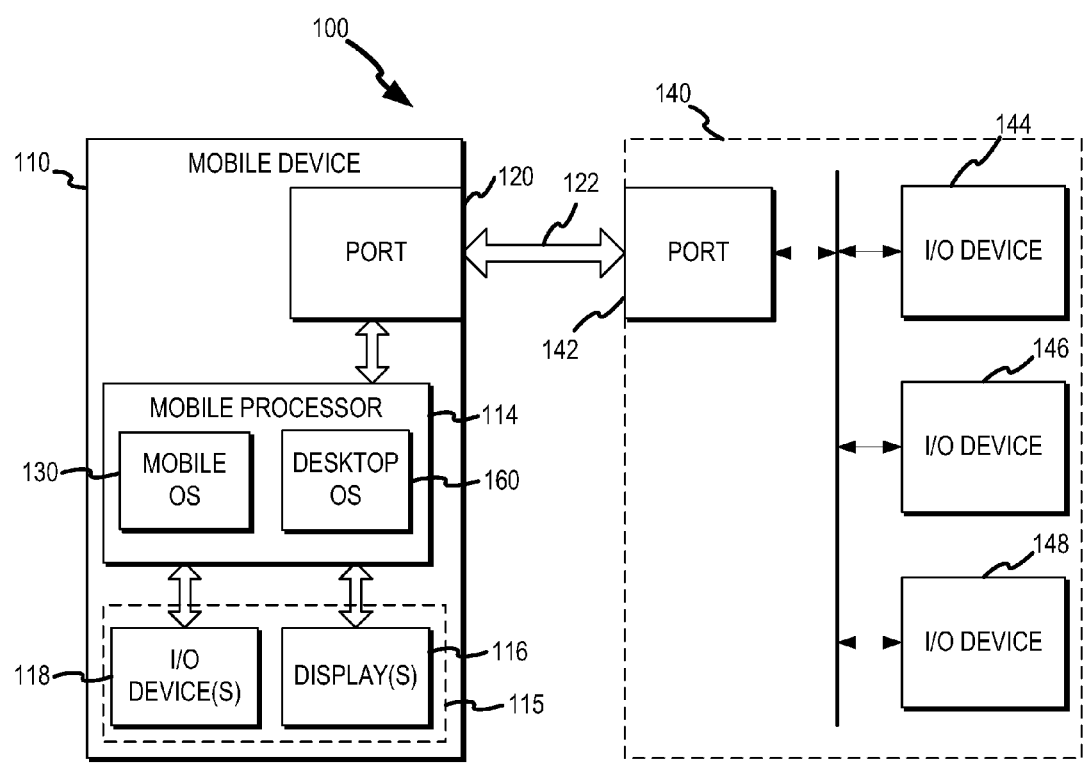
FIG. 1 illustrates a computing environment that provides multiple user computing experiences, according to various embodiments.

FIG. 1 illustrates a computing environment 100 that provides multiple user computing experiences with a mobile device that includes multiple operating systems associated with separate user interaction spaces (i.e., user environments), according to various embodiments. A first user interaction space 115 of computing environment 100 includes display(s) 116 and I/O devices 118 of mobile computing device 110. When mobile computing device 110 is operated as a stand-alone mobile device, mobile OS 130 presents a typical mobile computing user experience through user interaction space 115. The mobile computing experience provided by mobile OS 130 typically includes mobile telephony capabilities and a graphical user interface ("GUI") suited to user interaction space 115 including display(s) 116 and I/O device(s) 118. For example, display(s) 116 may be a touch-screen display(s) and application programs (i.e., "Apps") running on mobile OS 130 may be controlled primarily through a gesture-based GUI of mobile OS 130 using touch-screen display(s) 116.

In computing environment 100, mobile computing device 110 may be docked with secondary terminal environment 140 that includes I/O devices 144, 146, and/or 148. In embodiments, mobile computing device 110 is docked with secondary terminal environment 140 by connecting port 120 of mobile computing device 110 to port 142 of secondary terminal environment 140. In this instance, secondary terminal environment 140 presents a second user interaction space of computing environment 100. In some instances, the second user interaction space may be more suited to a desktop computing experience. In these instances, desktop OS 160 can be associated with secondary terminal environment 140 to provide the full capabilities of a notebook, tablet, or desktop computer environment through the second user interaction space.

In embodiments, mobile OS 130 and desktop OS 160 run concurrently on a shared kernel on a processor of mobile computing device 110. Concurrent execution of a mobile OS and a desktop OS on a shared kernel is described in more detail in U.S. patent application Ser. No. 13/217,108, filed Aug. 24, 2011, entitled "MULTI-OPERATING SYSTEM," herein incorporated by reference. In this way, a single mobile computing device can provide a mobile computing experience through a first user interaction space and a desktop computing experience through a second user interaction space. While the ability to carry one mobile device that can execute multiple operating systems concurrently through separate user interaction spaces solves a number of problems for a user, each user interaction space (through the concurrently running mobile OS and desktop OS) generally provides a separate set of available applications and user functionality.

Embodiments of the invention are directed to facilitating a seamless cross-environment workflow by allowing notifications within a first OS (e.g., mobile OS 130)

Embodiments of the invention are directed to facilitating apparent execution of an application running in a first OS (e.g., mobile OS 130) within a second OS (e.g., desktop OS 160), where the first and second OS are running concurrently on a shared kernel. Notably, providing a user with input (e.g., input device) and output (e.g., display, audio, etc.) support in a second OS for applications compiled for and running in a first (e.g., incompatible) OS involves addressing a number of issues. Additional issues can arise when handling display and interactivity of multiple applications running concurrently.

Consider, for example, that a first and second application are both compiled for the first OS and are running concurrently on the first OS. However, a user desires to view graphical output of the first application and to interact with that first application through input/output devices associated with the first OS (e.g., using a touchscreen display of a mobile computing environment), and to view graphical output of the second application and to interact with that second application through input/output devices associated with the second OS (e.g., using a display, keyboard, and mouse of a desktop computing environment). Handling this scenario involves concurrent handling of graphics in multiple display environments and concurrent processing of multiple input/output streams for separate applications all on separate (e.g., incompatible) operating systems.

Accordingly, embodiments provide various novel techniques for accessing applications of a first OS within a user interaction space of a second OS, displaying applications running in the first OS within the user interaction space of the second OS, and handling user interaction with those applications through the user interaction space of the second OS. Embodiments include a console application of the second OS that supports various display and user interaction features of cross-environment applications.

One set of embodiments provides techniques for concurrent user interface support across multiple-OS computing environments using a so-called "non-extended" rendering context. Another set of embodiments provides techniques for concurrent user interface support across multiple-OS computing environments using a so-called "extended" rendering context. Yet another set of embodiments provides techniques for concurrent user interface support across multiple OSs using a so-called "mirrored" context. Yet another set of embodiments provides access from the user interaction space of the second OS to applications available on the first OS. Each of these sets of embodiments will be described more fully below.

As described above, computing environment 100 provides multiple user computing experiences through multiple user interaction spaces associated with a mobile device running multiple operating systems concurrently. Specifically, because mobile computing device 110 includes multiple OSs, where each OS is suited to a particular computing environment, mobile computing device 110 may be adapted with external I/O devices to provide a broad range of user experiences with a single mobile computing device. For example, a user may have a mobile computing device 110 and a secondary terminal environment 140 that includes a keyboard, display, and/or pointing device(s) in a laptop-type enclosure. When mobile computing device 110 is docked with this laptop-like secondary terminal environment, the full capabilities of desktop OS 160 are available through the secondary terminal environment 140.

Figure 2:
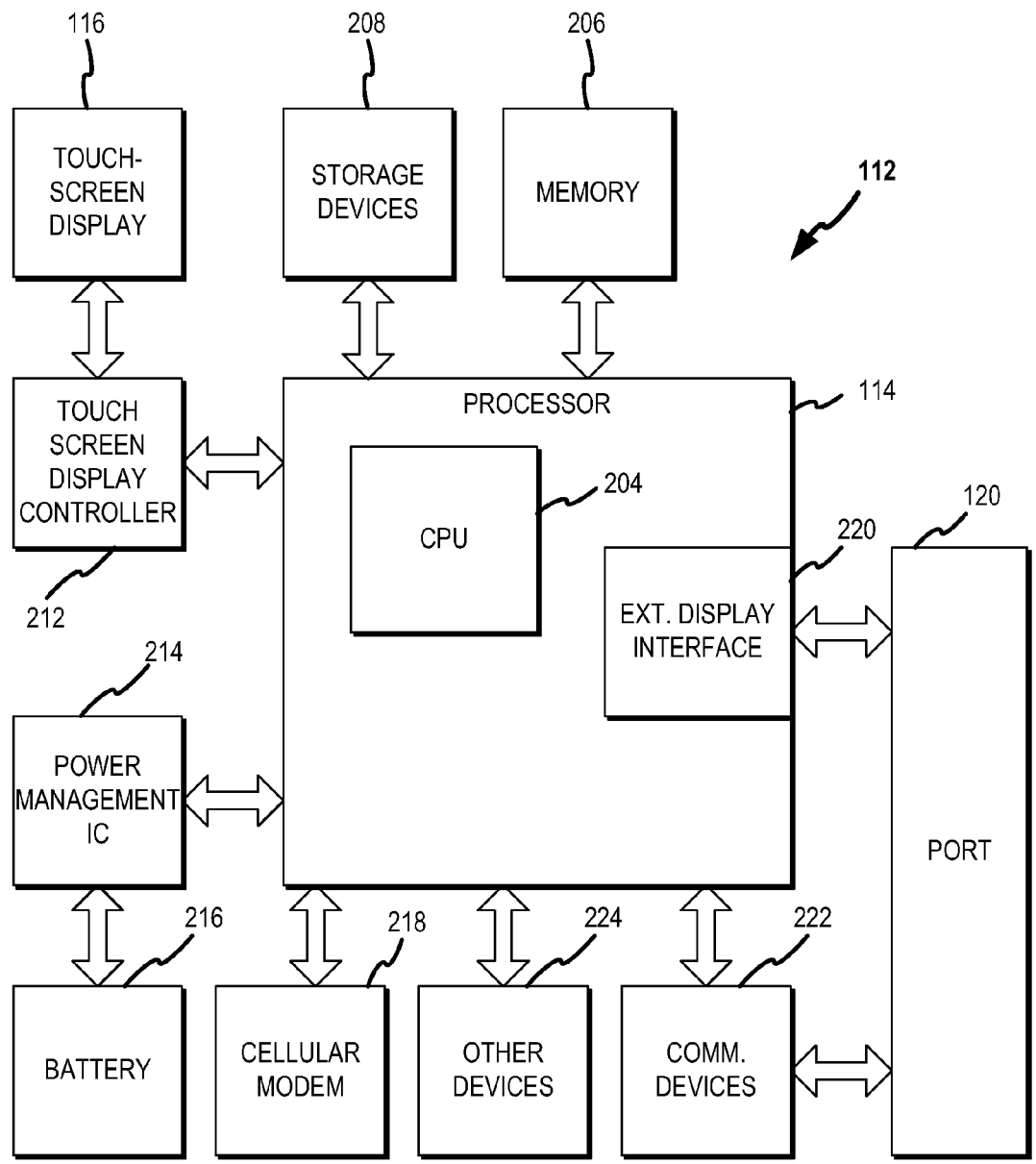
FIG. 2 illustrates an exemplary system architecture for a mobile computing device, according to various embodiments.

FIG. 2 illustrates an exemplary hardware system architecture for mobile computing device 110, according to various embodiments. Mobile computing device hardware 112 includes mobile processor 114 that includes one or more CPU cores 204 and external display interface 220. Generally, mobile computing device hardware 112 also includes I/O devices 118, memory 206, storage devices 208, touch-screen display controller 210 connected to touch-screen display 116, power management IC 214 connected to battery 216, cellular modem 218, communication devices 222, and/or other devices 224 that are connected to processor 114 through various communication signals and interfaces. I/O device(s) 118 generally includes buttons and other user interface components that may be employed in mobile computing device 110. For example, I/O devices 118 may include a set of buttons, (e.g., back, menu, home, search, etc.), off-screen gesture area, click-wheel, scroll-wheel, QWERTY keyboard, etc. Other devices 224 may include, for example, GPS devices, LAN connectivity, microphones, speakers, cameras, accelerometers, and/or MS/MMC/SD/SDIO card interfaces. External display interface 220 may be any suitable display interface (e.g., VGA, DVI, HDMI, etc.).

Processor 114 may be an ARM-based mobile processor. In embodiments, mobile processor 114 is a mobile ARM-based processor such as Texas Instruments OMAP3430, Marvell PXA320, Freescale iMX51, or Qualcomm QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the invention. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present invention.

Figure 3:
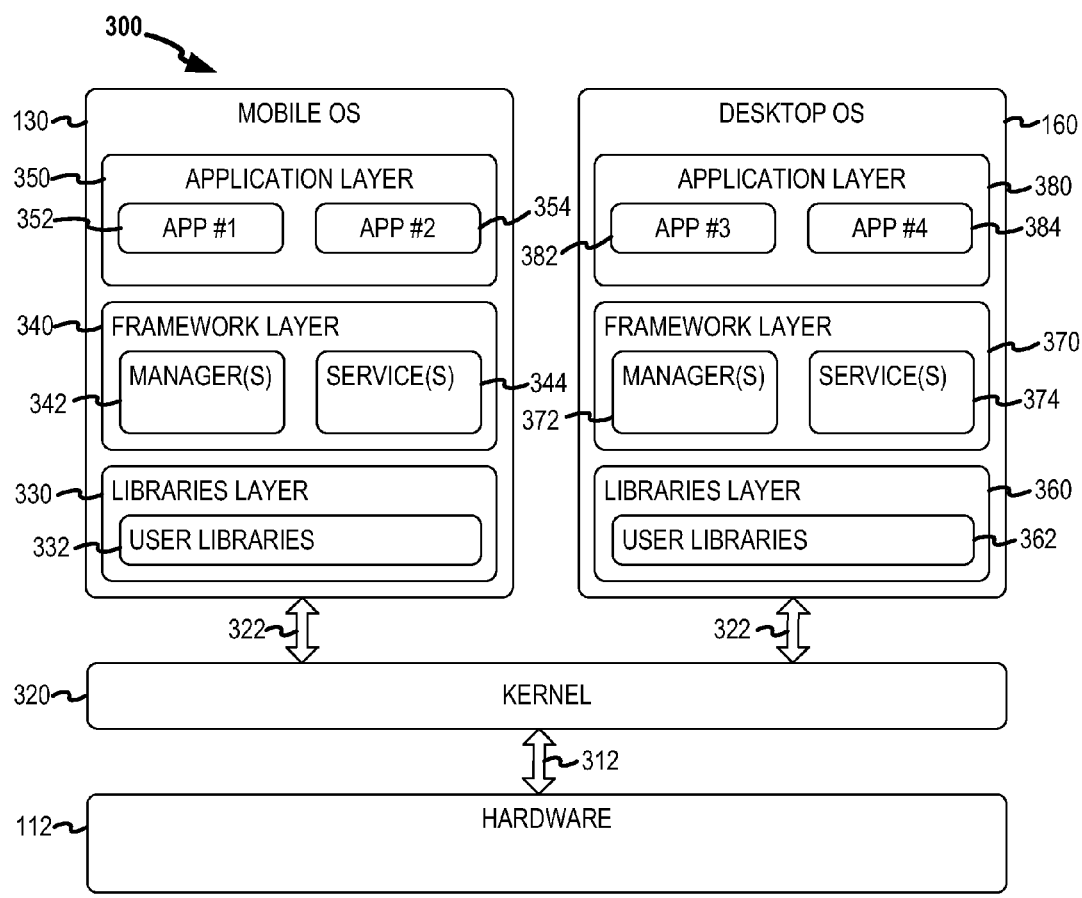
FIG. 3 illustrates an operating system architecture for a computing environment, according to various embodiments.

FIG. 3 illustrates OS architecture 300 that may be employed to run mobile OS 130 and desktop OS 160 concurrently on mobile computing device 110, according to various embodiments. As illustrated in FIG. 3, mobile OS 130 and desktop OS 160 are independent operating systems. Specifically, mobile OS 130 and desktop OS 160 may have independent and incompatible user libraries, graphics systems, and/or framework layers. Functions and instructions for OS architecture 300 may be stored as computer program code on a tangible computer readable medium of mobile computing device 110. For example, instructions for OS architecture 300 may be stored in storage device(s) 208 of mobile computing device hardware 112.

In OS architecture 300, mobile OS 130 and desktop OS 160 run concurrently on shared kernel 320. This means that mobile OS 130 and desktop OS 160 are running on shared kernel 320 at the same time. Specifically, mobile OS 130 and desktop OS 160 both interface to shared kernel 320 through the same kernel interface 322, for example, by making system calls to shared kernel 320. Shared kernel 320 manages task scheduling for processes of both mobile OS 130 and desktop OS 160. In this regard, mobile OS 130 and desktop OS 160 are running independently and concurrently on shared kernel 320. In addition, shared kernel 320 runs directly on mobile processor 114 of mobile computing device hardware 112, as illustrated by hardware interface 312. Specifically, shared kernel 320 directly manages the computing resources of mobile computing device hardware 112 such as CPU scheduling, memory access, and I/O. In this regard, hardware resources are not virtualized, meaning that mobile OS 130 and desktop OS 160 make system calls through kernel interface 322 without virtualized memory or I/O access.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. For example, application framework layer 340 may include a window manager, activity manager, package manager, resource manager, telephony manager, gesture controller, and/or other managers and services for the mobile environment. Application framework layer 340 may include a mobile application runtime environment that executes applications developed for mobile OS 130. The mobile application runtime environment may be optimized for mobile computing resources such as lower processing power and/or limited memory space. The mobile application runtime environment may rely on the kernel for process isolation, memory management, and threading support. Libraries layer 330 includes user libraries 332 that implement common functions such as I/O and string manipulation, graphics functions, database capabilities, communication capabilities, and/or other functions and capabilities.

As illustrated in FIG. 3, desktop OS 160 has libraries layer 360, framework layer 370, and application layer 380. In desktop OS 160, applications 382 and 384 run in application layer 380 supported by application framework layer 370 of desktop OS 160. Application framework layer 370 includes manager(s) 372 and service(s) 374 that are used by applications running on desktop OS 160. For example, application framework layer 370 may include a window manager, activity manager, package manager, resource manager, and/or other managers and services common to a desktop environment. Libraries layer 360 may include user libraries 362 that implement common functions such as I/O and string manipulation, graphics functions, database capabilities, communication capabilities, and/or other functions and capabilities.

In various embodiments of the present disclosure, desktop OS 160 runs in a separate execution environment from mobile OS 130. For example, mobile OS 130 may run in a root execution environment and desktop OS 160 may run in a secondary execution environment established under the root execution environment. Processes and applications running on mobile OS 130 access user libraries 332, manager(s) 342 and service(s) 344 in the root execution environment. Processes and applications running on desktop OS 160 access user libraries 362, manager(s) 372 and service(s) 374 in the secondary execution environment.

In embodiments, mobile OS 130 and desktop 160 are independent operating systems with incompatible user libraries, graphics systems, and/or application frameworks. Therefore, applications developed for mobile OS 130 may not run directly on desktop OS 160, and applications developed for desktop OS 160 may not run directly on mobile OS 130. For example, application 352, running in application layer 350 of mobile OS 130, may be incompatible with desktop OS 160, meaning that application 352 could not run on desktop OS 160. Specifically, application 352 may depend on manager(s) 342, service(s) 344, and/or libraries 332 of mobile OS 130 that are either not available or not compatible with manager(s) 372, service(s) 374, and/or libraries 362 of desktop OS 160.

As a result, mobile OS 130 and desktop OS 160 may have different sets of available applications. In this regard, mobile OS 130 and desktop OS 160 of OS architecture 300 provide separate user experiences through separate sets of applications accessible through separate user interaction spaces. The user may access the applications available on (i.e., compiled for and loaded within the execution environment of) mobile OS 130 through a first user interaction space associated with mobile OS 130, and the applications available on desktop OS 160 through a second user interaction space associated with desktop OS 160.

As described above, mobile operating systems typically do not use the same graphics environment as desktop operating systems. Graphics environments for desktop OS's were designed for flexibility and high performance. For example, the X-window system, used by some desktop OSs, provides platform and network independence at the expense of greater processing and system resources. In contrast, graphics environments for mobile OSs are designed more for efficiency and the specific user input devices of a mobile computing environment and less for flexibility. Because the graphics environments of mobile and desktop OS's are often different, an application running on a mobile OS may not be re-directed to display within a user space of a desktop OS by re-directing the graphics information from the graphics server of the mobile OS to the graphics server of the desktop OS.

The most widely adopted mobile OS is Google's Android. While Android is based on Linux, it includes modifications to the kernel and other OS layers for the mobile environment and mobile processors. In particular, while the Linux kernel is designed for a PC (i.e., x86) CPU architecture, the Android kernel is modified for ARM-based mobile processors. Android device drivers are also particularly tailored for devices typically present in a mobile hardware architecture including touch-screens, mobile connectivity (GSM/EDGE, CDMA, Wi-Fi, etc.), battery management, GPS, accelerometers, and camera modules, among other devices. In addition, Android does not have a native X Window System nor does it support the full set of standard GNU libraries, and this makes it difficult to port existing GNU/Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X desktop OS, common Mac OS X applications do not run natively on iOS. Specifically, iOS applications are developed through a standard developer's kit ("SDK") to run within the "Cocoa Touch" runtime environment of iOS, which provides basic application infrastructure and support for key iOS features such as touch-based input, push notifications, and system services. Therefore, applications written for Mac OS X do not run on iOS without porting. In addition, it may be difficult to port Mac OS X applications to iOS because of differences between user libraries and/or application framework layers of the two OSs, and/or differences in system resources of the mobile and desktop hardware.

Figure 4:
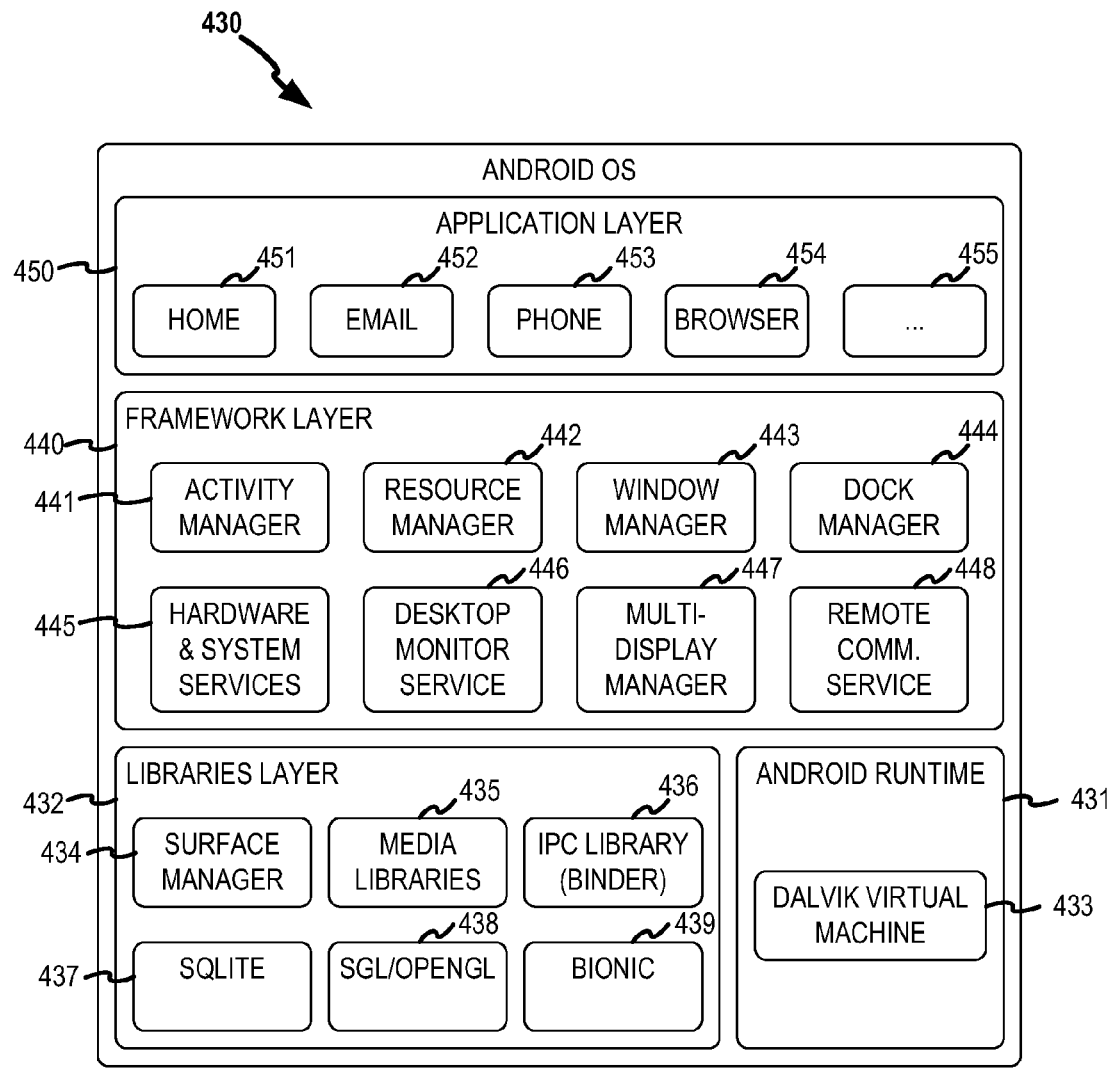
FIG. 4 illustrates a mobile operating system that may be employed in a multiple operating system computing architecture, according to various embodiments.
Figure 5:
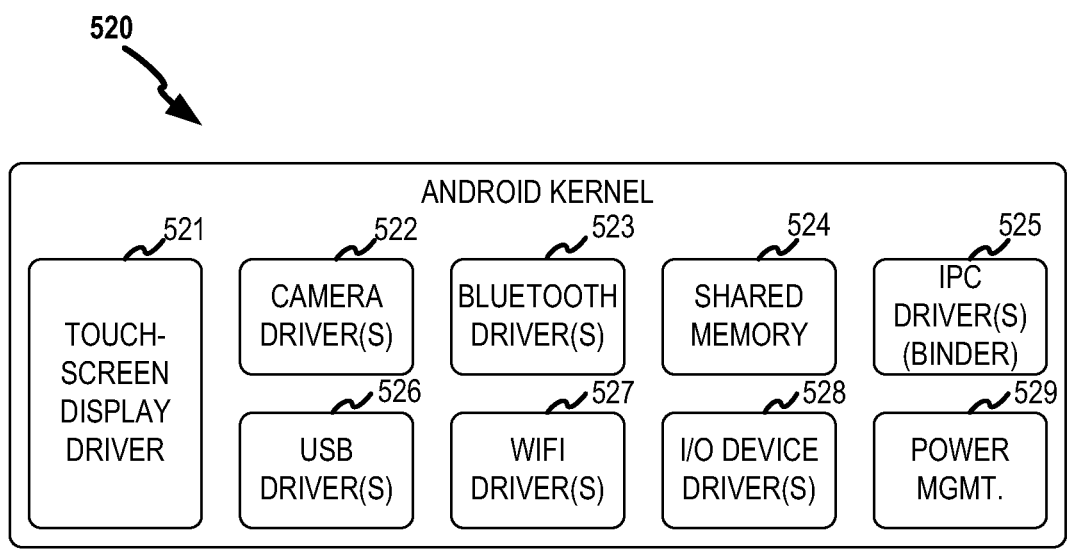
FIG. 5 illustrates aspects of an operating system architecture for a computing environment, according to various embodiments.
Figure 6:
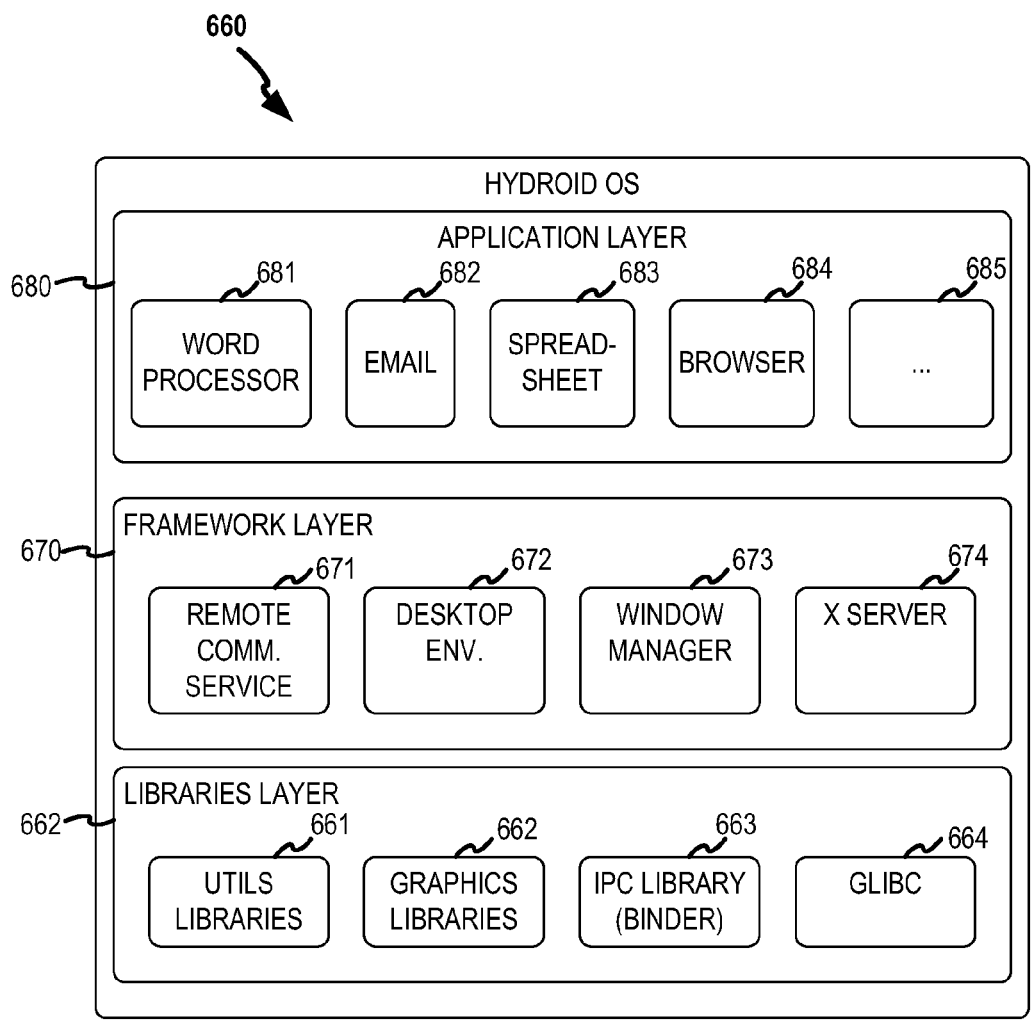
FIG. 6 illustrates a desktop operating system that may be employed in a multiple operating system computing architecture, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid") may be a modified Debian Linux desktop OS. FIGS. 4-6 illustrate Android mobile OS 430, Android kernel 520, and Hydroid OS 660 that may be employed in OS architecture 300 in more detail, according to various embodiments.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that managers access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, desktop monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 430 run within the Dalvik virtual machine 431 in the Android runtime environment 433 on top of the Android object-oriented application framework. Dalvik virtual machine 431 is a register-based virtual machine, and runs a compact executable format that is designed to reduce memory usage and processing requirements. Applications running on Android OS 430 include home screen 451, email application 452, phone application 453, browser application 454, and/or other application(s) ("App(s)") 455.

The Android OS graphics system uses a client/server model. A surface manager ("SurfaceFlinger") is the graphics server and applications are the clients. SurfaceFlinger maintains a list of display ID's and keeps track of assigning applications to display ID's. In one embodiment, mobile computing device 110 has multiple touch screen displays 116. In this embodiment, display ID 0 is associated with one of the touch screen displays 116 and display ID 1 is associated with the other touch screen display 116. Display ID 2 is associated with both touch screen displays 116 (i.e., the application is displayed on both displays at the same time). Display ID's greater than 2 are virtual displays, meaning that they are not associated with a display physically present on mobile computing device hardware 112.

Graphics information for Android applications includes windows, views, and canvasses. Each window, view, and/or canvas is implemented with an underlying surface object. Surface objects are double-buffered (front and back buffers) and synchronized across processes for drawing. SurfaceFlinger maintains all surfaces in a shared memory pool which allows all processes within Android to access and draw into them without expensive copy operations and without using a server-side drawing protocol such as X-Windows. Applications always draw into the back buffer while SurfaceFlinger reads from the front buffer. SurfaceFlinger creates each surface object, maintains all surface objects, and also maintains a list of surface objects for each application. When the application finishes drawing in the back buffer, it posts an event to SurfaceFlinger, which swaps the back buffer to the front and queues the task of rendering the surface information to the frame buffer.

SurfaceFlinger monitors all window change events. When one or more window change events occur, SurfaceFlinger renders the surface information to the frame buffer for one or more displays. Rendering includes compositing the surfaces, i.e., composing the final image frame based on dimensions, transparency, z-order, and visibility of the surfaces. Rendering may also include hardware acceleration (e.g., OpenGL 2D and/or 3D interface for graphics processing hardware). SurfaceFlinger loops over all surface objects and renders their front buffers to the frame buffer in their Z order.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 530. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the "glibc" Linux C library 664, Linux graphics libraries 662 (e.g., GTK, OpenGL, etc.), Linux utilities libraries 661, Linux database libraries, and/or other Linux user libraries. Applications run on Hydroid within an X-Windows Linux graphical environment using X-Server 674, window manager 673, and/or desktop environment 672. Illustrated applications include word processor 681, email application 682, spreadsheet application 683, browser 684, and other application(s) 685.

The Linux OS graphics system is based on the X-windows (or "X11") graphics system. X-windows is a platform-independent, networked graphics framework. X-windows uses a client/server model where the X-server is the graphics server and applications are the clients. The X-server controls input/output hardware associated with the Linux OS such as displays, touch-screen displays, keyboards, pointing device(s), etc. In this regard, X-windows provides a server-side drawing graphics architecture, i.e., the X-server maintains the content for drawables including windows and pixmaps. X-clients communicate with the X-server by exchanging data packets that describe drawing operations over a communication channel. X-clients access the X communication protocol through a library of standard routines (the "Xlib"). For example, an X-client may send a request to the X-server to draw a rectangle in the client window. The X-server sends input events to the X-clients, for example, keyboard or pointing device input, and/or window movement or resizing. Input events are relative to client windows. For example, if the user clicks when the pointer is within a window, the X-server sends a packet that includes the input event to the X-client associated with the window that includes the action and positioning of the event relative to the window.

Because of the differences in operating system frameworks, graphics systems, and/or libraries, applications written for Android do not generally run on Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

Referring back to FIG. 1, mobile computing device 110 presents a mobile computing user experience through a first user environment 115 associated with mobile OS 130. A primary aspect of a typical mobile computing user experience involves communications over one of several wired and/or wireless communications interfaces. For example, mobile computing device 110 may support cellular network communications (i.e., voice, text, and/or data over a cellular network), local network connections, wireless network connections (e.g., Wi-Fi, WiMax, Bluetooth, etc.), and/or other communication interfaces. Over some communications interfaces, mobile computing device 110 may receive incoming communications such as voice calls, text messages, multimedia messages, email, and/or other messages. As such, mobile OS 130 typically includes support for several communications protocols over the various wired and wireless interfaces, including telephone support, text (SMS) and multimedia (MMS) messages, Internet protocols and/or other communications protocols.

To allow applications and other components of the OS to be aware of incoming communications, mobile OSs typically include a notification system. Notification systems provide a way for applications, managers, and/or services of the mobile OS to receive notifications from a communications network (i.e., remote notifications) and notifications from other applications, managers, and/or services of the mobile OS (i.e., local notifications). Remote notifications may include, for example, incoming voice calls, text messages, and multimedia messages that may be handled by a telephony manager of the mobile OS. Local notifications may include, for example, alarms, reminders, and other notifications. The notification system may also allow applications and/or services to be notified of changes in status of various systems and/or services.

The mobile OS may include a notification manager for handing notification to the user of various events. The user may be notified of an event through various visual, audio, and/or other user notifications. For example, a message window (e.g., modal dialog box or Toast notification) may appear within the GUI of the mobile OS to alert the user of an incoming call or text. Alternatively, a persistent icon in the status bar may appear or change state to indicate an incoming notification. Selecting the icon or the user controls of the message window may launch an application, service, message handler, and/or notification center.

Figure 7:
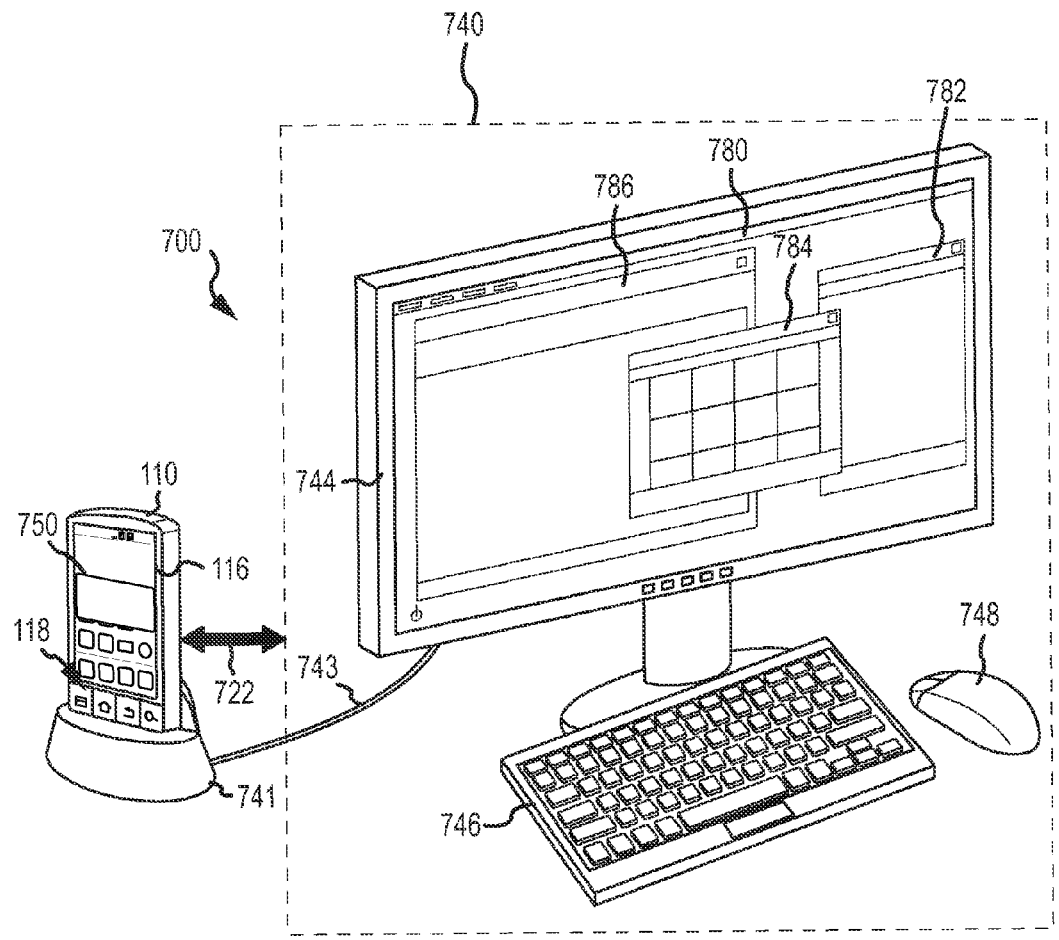
FIG. 7 illustrates a multiple-OS computing environment that supports multiple user environments, according to various embodiments.

FIG. 7 illustrates a multiple-OS computing environment 700 that supports multiple user environments, according to various embodiments. As described above, the mobile computing device 110 presents a first user environment associated with the mobile OS that includes touch-screen display(s) 116 and other I/O devices 118 of mobile computing device 110. As illustrated in FIG. 7, the user interface 750 of the mobile OS 130 is displayed on touch-screen display 116. In computing environment 700, mobile computing device 110 is docked to a second user environment 740 through dock interface 722. The second user environment includes display monitor 744, keyboard 746, and/or pointing device 748. In this regard, the second user environment 740 is a desktop-like terminal environment. When docked through dock interface 722, the mobile device associates desktop OS 160 with the second user environment 740 such that the user interface 780 of the desktop OS is displayed on the display 744 of the second user environment 740. While in FIG. 7 the second user environment 740 is illustrated as a typical desktop-type computing environment, mobile computing device 110 may be docked with other types of secondary user environments, including laptop-type, tablet-type, and/or other types. As illustrated in FIG. 7, mobile computing device is connected to components of the second user environment 740 through a dock cradle 741 and/or dock cable 743, however, dock interface 722 may include different connectors including other wired or wireless connections to components of the second user environment.

As described above, when mobile computing device 110 is docked, desktop OS 160 may be associated with the second user environment 740. In this instance, the user may be interacting with the desktop OS through the second user environment. However, events of which the user may want to be aware may occur within the mobile OS. For example, the mobile computing device may receive an incoming call, which may be handled by a telephony manager of the mobile OS. When the mobile computing device receives an incoming call while the user is actively interacting with the desktop OS through the second user environment, the user may either miss the incoming call, or have to look to the user interface on the mobile computing device 110 associated with the mobile OS to handle the incoming call.

Figure 8:
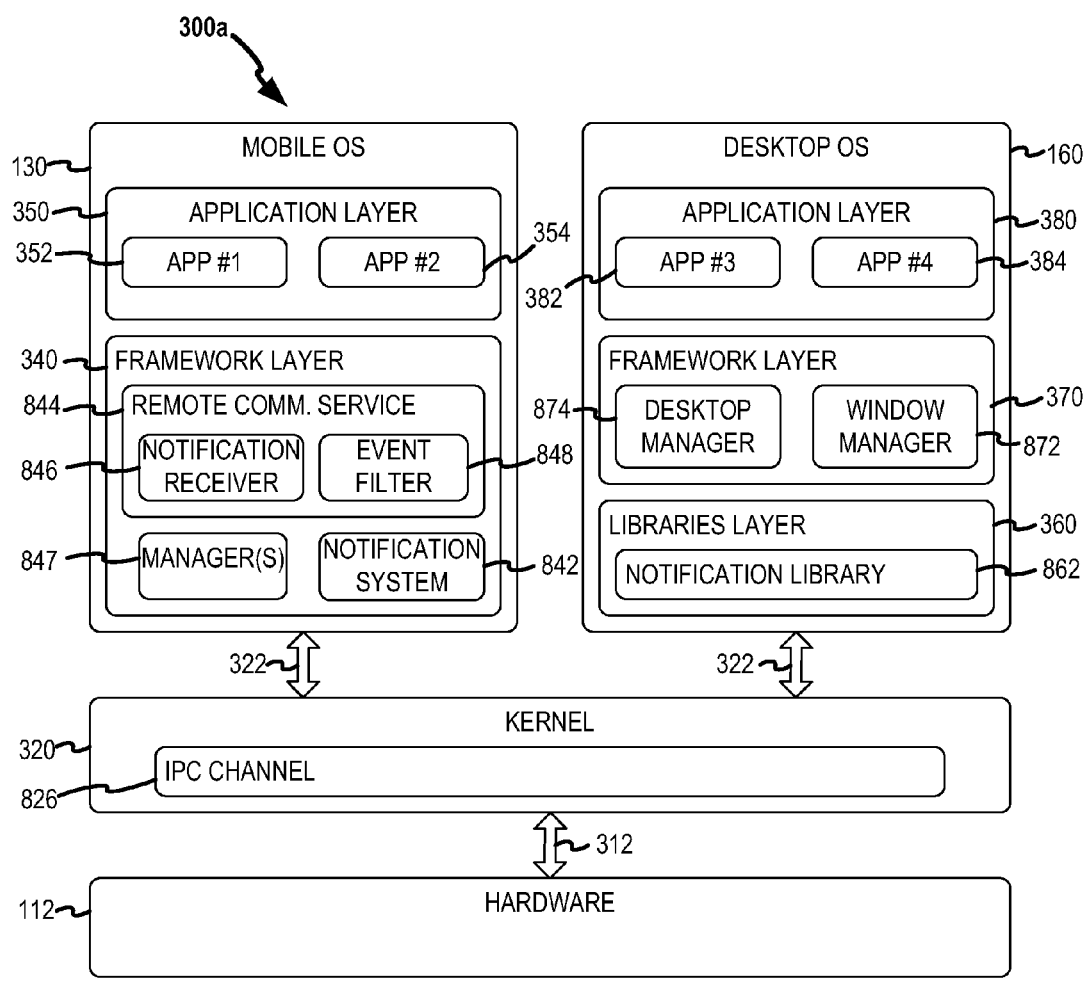
FIG. 8 illustrates a computing environment that provides cross-environment notification and event handling in a multi-OS computing environment, according to various embodiments

FIG. 8 illustrates a computing environment 300a that extends computing environment 300 to provide cross-environment notification and event handling in a multi-OS computing environment, according to various embodiments. In computing environment 300a, mobile OS 130 and desktop 160 are in active concurrent execution on shared kernel 320 on a mobile computing device. Computing environment 300a facilitates cross-environment notification of events by providing components for monitoring and filtering the notifications of mobile OS 130 and passing those notifications to various notification handlers within desktop OS 160.

More specifically, various manager(s) 847 and/or services of mobile OS may generate notifications based on incoming communications (i.e., remote notifications), local events, and/or system or service status changes. Notification system 842 broadcasts these events within mobile OS 130. Notification receiver 846 in remote communication service 844 of mobile OS 130 monitors events occurring within mobile OS 130. Remote communications service 844 also includes event filter 848 that filters events received in remote communications service 844 for predetermined events for which notifications should be passed to desktop OS 160. Notification receiver 846 receives notification events of mobile OS 130, and after event filter 848 filters the events for predetermined events for which components of the desktop OS should be notified, appropriate notification functions of remote communication service 844 are called to pass the notifications through the inter-process communication channel to event handlers in notification library 862 of desktop OS 160. Remote communication service 844 may also query components of the mobile OS for parameters associated with the event. For example, an event may indicate a status change in a system or service of mobile OS 130. Remote communication service 844 may query the event object for parameters associated with the event. Remote communication service 844 then passes the parameters within the notification to notification library 862 of desktop OS 160.

In embodiments, notification receiver 846 also filters notifications by registering to receive certain predetermined notifications of mobile OS 130. For example, in the Android mobile OS, the remote communication service may instantiate a broadcast receiver with an intent filter. The intent filter describes the intent objects that the broadcast receiver will receive from the notification manager. The intent filter also associates the intent objects with actions to be performed when the intent object is received in the broadcast filter. Through the intent filter, the broadcast receiver performs runtime binding between predetermined Android events and notifications passed to the desktop OS. Because the broadcast receiver effectively performs event filtering, in this case the separate event filter 848 is not required.

Notification library 862 of desktop OS 160 includes routines for handling notifications coming from mobile OS 130. Event handlers of notification library 862 perform the low-level communication to receive event notifications from remote communication service 844 and pass the event notifications to a component of desktop OS 160. For example, notification library event handlers may be used by applications (e.g., application 382, 384) and/or components of the desktop OS UI to receive notifications coming from remote communication service 844 of the mobile OS. For example, the window manager 872 and/or desktop manager 874 may receive notifications from the mobile OS using notification library 862.

Remote communication service 844 communicates with event handlers of notification library 862 through an inter-process communication channel 826 of shared kernel 320. For example, remote communication service 844 may communicate with notification library 862 through a unix domain socket, IPC socket, and/or network socket. In one embodiment, remote communication service communicates with notification library 862 through an IPC channel of shared kernel 320 using an abstract named socket.

Notification library 862 may include handlers for various notifications and various notification mechanisms. Some notification handlers of notification library 862 may handle event notifications by displaying a message or icon within the component or application. Other event handlers may play a sound associated with the notification. The message, icon, or sound may be included in the notification passed from the mobile OS. Other event handlers may present interactive notifications that provide mechanisms for the user to respond to the event by launching applications or services of mobile OS 130 and/or desktop OS 160.

Figure 9:
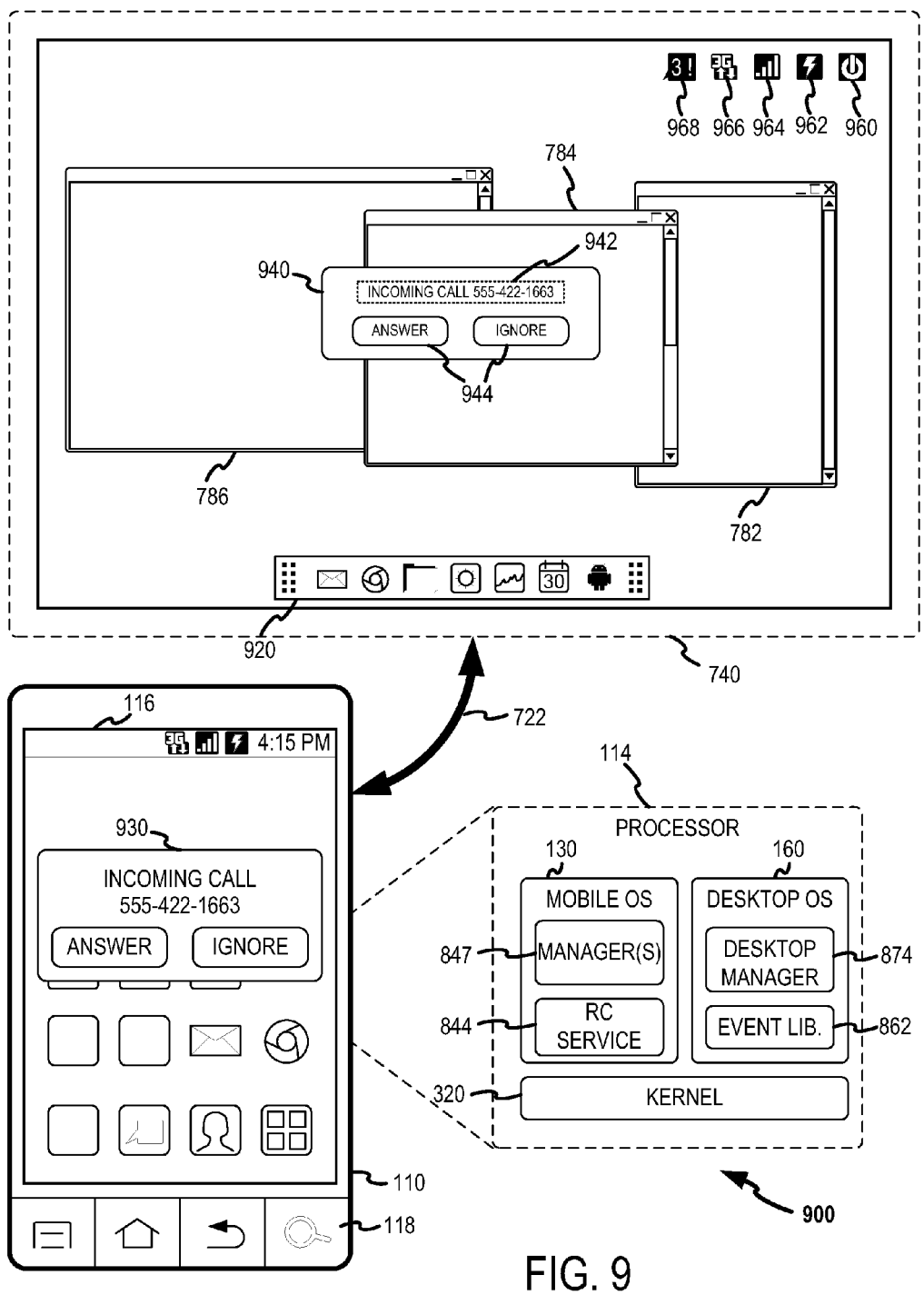
FIG. 9 illustrates how aspects of the computing environment of FIG. 8 provide cross-environment notification handling in more detail, according to various embodiments

FIG. 9 illustrates how aspects of computing environment 300a provide cross-environment notification handling, according to various embodiments. FIG. 9 illustrates computing environment 900 in which the mobile device 110 is docked to the second user environment 740, as illustrated in FIG. 7. In computing environment 900, mobile OS 130, running on processor 114 of mobile computing device 110, provides a first user environment through display 116 and other I/O devices 118 of mobile computing device 110. Desktop OS 160, running concurrently with mobile OS 130 on shared kernel 320 on processor 114 of mobile computing device 110, is associated with the second user environment 740. Mobile OS 130 includes manager(s) 846 that handle various events occurring within mobile OS 130. For example, manager(s) 847 may include a telephony manager, battery/power manager, alarm manager, and/or other managers.

In computing environment 900, remote and local notifications of mobile OS 130 may be displayed within the second user environment 740 associated with desktop OS 160. For example, notification 940 illustrates that computing environment 900 can display an incoming call event of mobile OS 130 as a message box notification in desktop OS 160. Notification 940 may include a message 942 and/or user controls 944 for responding to the notification. Notification 940 may persist as long as the call is considered to be incoming (i.e., as long as the call is pending answer at the mobile device), or for some shorter period of time. As illustrated in FIG. 9, notification 940 appears within a dialog box within the UI of desktop OS 160. However, notification 940 may appear within the menu bar 920 of desktop OS 160, or in another UI component of desktop OS 160. Notification 940 may appear in addition to a notification 930 displayed within the GUI of mobile OS 130, or, in embodiments, notification 940 may appear in the desktop OS GUI in place of notification 930 appearing in the mobile OS GUI.

FIG. 9 illustrates other ways in which notifications may be presented within the GUI of desktop OS 160 to events within mobile OS 130. For example, icons 960, 962, 964, 966, and/or 968 illustrate that notifications may appear as icons within the desktop OS GUI. The icons may appear within an area of the desktop GUI, within a status bar of the desktop GUI, and/or within a menu bar (e.g., menu bar 920) of the desktop GUI. In computing environment 900, icon 960 indicates the power status of mobile computing device 110 and allows the user to power down mobile computing device 110 from within the desktop GUI. Icon 962 indicates information from the battery/power manager of mobile OS 130. In this case, icon 962 indicates that the battery is currently being charged from an external power source. Icons 964 and 966 present information from the telephony manager related to connections of mobile device 110 to various communications interfaces. For example, icon 964 indicates the signal strength of a wireless connection to a network while icon 966 indicates the type of service currently available over a wireless network. Icon 968 indicates the number of alerts that the user has not acknowledged.

Still referring to FIG. 9, a user notification within the user environment of desktop OS 160 of an event from mobile OS 130 is described in more detail. Initially, an event occurs in mobile OS 130 that triggers a notification within mobile OS 130. For example, an incoming call may be received by mobile computing device 110 that is handled by a telephony manager of mobile OS 130. The notification system broadcasts the notification to systems and services of mobile OS 130 that have registered to receive the notification. Remote communication service 844 of mobile OS 130 instantiates a notification receiver that is registered to receive the notification. For example, in the Android mobile OS, remote communication service 844 may instantiate a broadcast receiver to receive broadcast notification intent objects.

Remote communication service 844 filters the event to determine if the event should trigger a notification to event library 862 of desktop OS 160. If the event should trigger a notification on the desktop, the remote communication service passes a notification through an IPC channel to notification library 862. The notification within mobile OS 130 may include a message, sound, and/or icon that is passed to the event handler in the notification library. For example, a notification received as an intent object by the broadcast receiver may include a message, sound, and/or icon. The component and/or application of desktop OS 160 that instantiates the receiving event handler of notification library 862 receives the notification. In computing environment 900, desktop manager 874 of desktop OS 160 instantiates an event handler for incoming call notifications of mobile OS 130. The event handler instantiated by desktop manager 874 displays the notification 940, including the notification message 942 and user controls 944.

A user can take various actions in response to notifications by selecting notification user controls or icons associated with the notification. For example, in computing environment 900, the user can select the options of ignoring or answering the incoming call by selecting the user controls 944 of notification 940. The user controls or icons of notifications may make callbacks to functions or applications of mobile OS 130 and/or functions or applications of desktop OS 160. In embodiments, a user control of a notification may launch an application of desktop OS 160 for display of an application program running in mobile OS 130. Cross-environment display of applications is discussed in more detail in co-pending U.S. patent application Ser. No. 13/246,665, filed Sep. 27, 2011, entitled "Instant Remote Rendering," the entire contents of which are incorporated herein by reference for all purposes. For example, selecting the "answer" user control on notification 940 in the desktop GUI may launch a console application within the desktop OS that displays a phone application running on mobile OS 130 within the GUI of desktop OS 160 using the techniques described in that application. In this manner, the user could answer the telephone call through the user environment associated with the desktop OS instead of having to switch user environments to answer the telephone call using the mobile OS.

Figure 10:
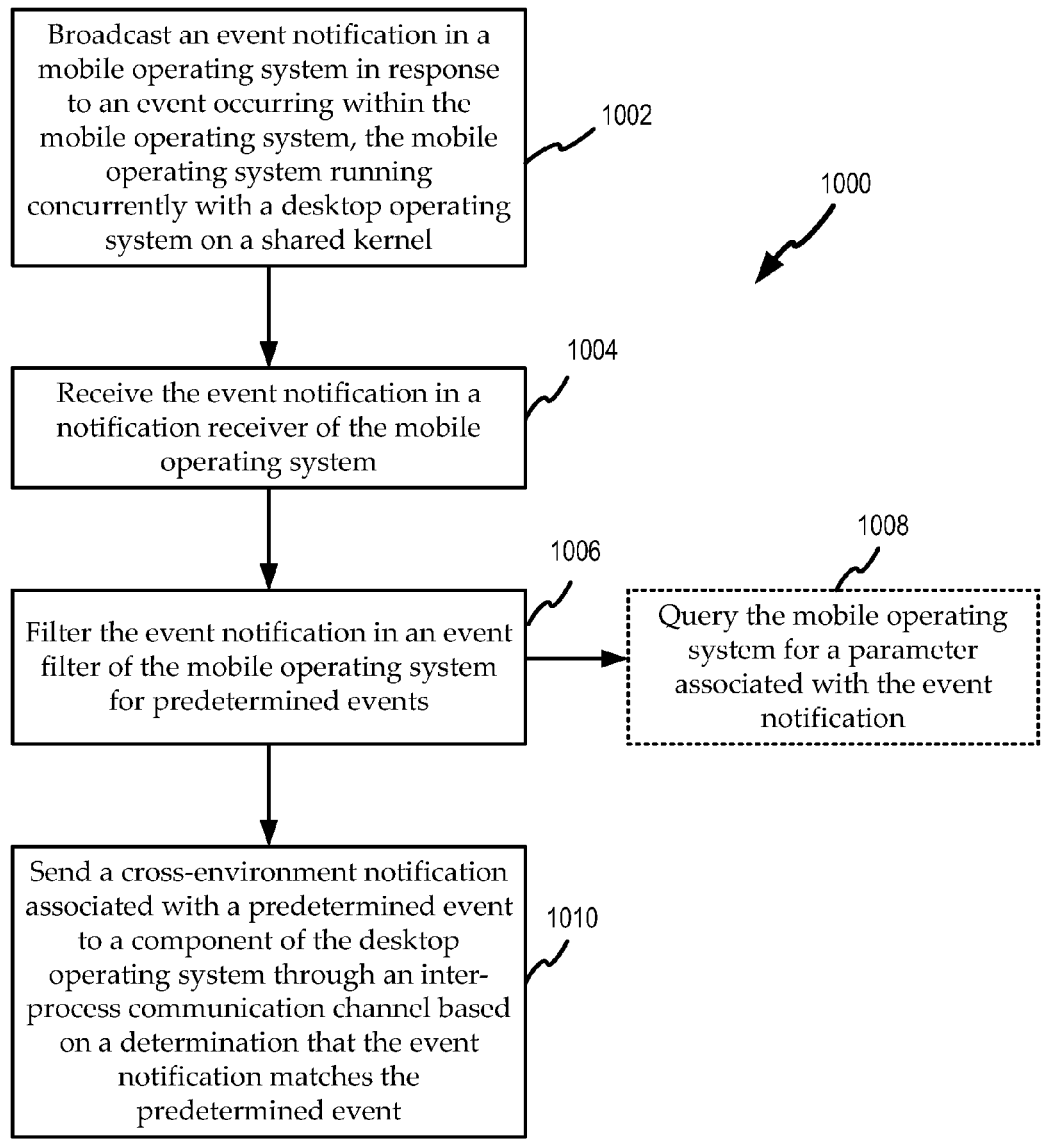
FIG. 10 illustrates an exemplary process flow for providing cross-environment notification and event handling in a multi-OS computing environment, according to various embodiments.

FIG. 10 illustrates an exemplary process flow 1000 to provide cross-environment notification and event handling in a multi-OS computing environment, according to various embodiments. The multi-OS computing environment may include, for example, a mobile operating system and a desktop operating system running concurrently on a shared kernel. Process flow 1000 begins at block 1002, when an event notification is broadcast in the mobile operating system in response to an event occurring within the mobile operating system. For example, the event notification could be broadcast in response to an incoming call or other event occurring as a result of an incoming communication. As another example, the event notification could be the result of a local notification such as an alarm event. At block 1004, the event notification is received in a notification receiver of the mobile operating system. For example, the event notification may be received in an Android mobile OS by a broadcast receiver.

At block 1006, the mobile OS filters the event notification using an event filter for predetermined events. At optional block 1008, as a result of the event notification matching a predetermined event, the mobile OS may be queried for additional parameters associated with the event notification. For example, an event notification may indicate a status change in a system or service of the mobile OS (e.g., battery state change, device configuration change, time change, etc.). The notification receiver may query the system or service for parameters related to the status change. At block 1010, the mobile OS sends a cross-environment notification associated with a predetermined event to a component of the desktop operating system through an inter-process communication channel based on a determination that the event notification matches the predetermined event. The cross-environment notification may include the parameters received in response to the query of block 1008.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:
  broadcasting an event notification in a mobile operating system in response to an event occurring within the mobile operating system, the mobile operating system running concurrently and independently with a desktop operating system on a shared kernel;
  receiving the event notification in a notification receiver of the mobile operating system;
  filtering the event notification in an event filter of the mobile operating system for predetermined events; and sending a cross-environment notification associated with a predetermined event to a component of the desktop operating system through an inter-process communication channel of the shared kernel based on a determination that the event notification matches the predetermined event;

wherein the broadcasting of an event notification is to systems and services of the mobile operating system that are registered to receive the event notification;

wherein the notification receiver is registered to receive the event notification; and wherein the mobile operating system and the desktop operating system make system calls through the shared kernel without virtualized memory.

2. The method of claim 1, further comprising querying the mobile operating system for a parameter associated with the event notification.

3. The method of claim 1, wherein the event notification is received in a broadcast receiver of the mobile operating system.

4. The method of claim 3, wherein the broadcast receiver performs runtime binding of predetermined events to cross-environment notifications.

5. The method of claim 1, further comprising displaying, by the desktop operating system, a message associated with the cross-environment notification.

6. The method of claim 1, further comprising displaying, by the desktop operating system, an icon associated with the cross-environment notification.

7. The method of claim 1, wherein the event notification is received in an intent filter of a broadcast receiver of the mobile operating system.

8. The method of claim 1, wherein the cross-environment notification is received in the desktop operating system by an event handler of a shared library of the desktop operating system.

9. The method of claim 1, wherein the mobile operating system comprises an Android mobile operating system and the desktop operating system comprises a Linux desktop operating system.

10. The method of claim 1, further comprising receiving, in the mobile operating system, a reply from the component of the desktop operating system indicating an action to perform in response to a user selection of a notification callback of the cross-environment notification.

11. A mobile computing device, comprising:
a non-transitory computer-readable medium storing instructions for a physical processor;
a notification manager that broadcasts intent objects to systems and services of a mobile operating system that are registered to receive the intent objects in response to events occurring within the mobile operating system, the mobile operating system running concurrently and independently with a desktop operating system on a shared kernel of the mobile computing device, wherein the mobile operating system and the desktop operating system make system calls through the shared kernel without virtualized memory;
a broadcast receiver that receives the intent objects, the broadcast receiver registered to receive the intent objects;
an intent filter that filters the intent objects for intent objects associated with predetermined events, wherein the intent filter associates the intent objects with actions to be performed when the intent object is received; and
a cross-environment event notifier that sends cross-environment notifications associated with the predetermined events to components of the desktop operating system that instantiate event listeners of a shared library corresponding to the predetermined events.

12. The mobile computing device of claim 11, wherein the notification manager queries the mobile operating system for parameters, the parameters associated with the intent objects associated with the predetermined events.

13. The mobile computing device of claim 12, wherein the cross-environment notifications include the parameters received in response to the queries.

14. A mobile computing device including a non-transitory computer-readable medium storing instructions for a physical processor, the instructions, when executed, causing the processor to perform steps comprising:
running a mobile operating system and a desktop operating system concurrently and independently on a shared kernel;
broadcasting an event notification in the mobile operating system in response to an event occurring within the mobile operating system;
receiving the event notification in a notification receiver of the mobile operating system;
filtering the event notification in an event filter of the mobile operating system for predetermined events; and
sending a cross-environment notification associated with a predetermined event to a component of the desktop operating system through an inter-process communication channel of the shared kernel based on a determination that the event notification matches the predetermined event;
wherein the broadcasting of an event notification is to systems and services of the mobile operating system that are registered to receive the event notification;
wherein the notification receiver is registered to receive the event notification; and
wherein the mobile operating system and the desktop operating system make system calls through the shared kernel without virtualized memory.

15. The mobile computing device of claim 14, wherein the instructions further cause the processor to perform the step of querying the mobile operating system for a parameter associated with the event notification.

16. The mobile computing device of claim 14, wherein the instructions further cause the processor to perform the step of receiving, in the mobile operating system, a reply from the component of the desktop operating system indicating an action to perform in response to a user selection of a notification callback of the cross-environment notification.

17. The mobile computing device of claim 14, wherein the instructions further cause the processor to perform the step of displaying the notification on a display of a user environment associated with the desktop operating system.

18. The mobile computing device of claim 14, wherein the instructions further cause the processor to perform the step of receiving the cross-environment notification in an event handler of a shared library of the desktop operating system.

19. The mobile computing device of claim 14, wherein the instructions further cause the processor to perform the step of sending a notification reply message from the desktop operating system to the mobile operating system indicating that the notification was received by a user.

20. The mobile computing device of claim 14, wherein the mobile operating system comprises an Android mobile operating system and the desktop operating system comprises a Linux desktop operating system.

* * * * *